US012639169B1

(12) United States Patent (10) Patent No.: US 12,639,169 B1
Godbole et al. (45) Date of Patent: May 26, 2026

(54) FORMING DATA SHARDS TO ASSIGN TO DEDUPLICATION DOMAINS IN A DEDUPLICATION FILE SYSTEM

(71) Applicant: Dell Products L.P., Round Rock, TX (US)

(72) Inventors: Kedar Godbole, Pune (IN); Sandeep T. Nirmale, Santa Clara, CA (US); Srisailendra Yallapragada, Cupertino, CA (US); Chetan Chandrakant Paithane, Pune (IN); Sandeep Kumar, Pune (IN); Fani Jenkins, Boulder, CO (US); Srikant Viswanathan, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/038,273

(22) Filed: Jan. 27, 2025

(51) Int. Cl.
*G06F 16/10* (2019.01)
*G06F 11/1446* (2026.01)
*G06F 16/174* (2019.01)

(52) U.S. Cl.
CPC ...... *G06F 11/1453* (2013.01); *G06F 11/1451* (2013.01); *G06F 16/1748* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 9,189,405 B2 | 11/2015 | Kaplinger | |
| 9,703,642 B2 * | 7/2017 | Aronovich | ............. G06F 11/14 |
| 11,442,902 B2 | 9/2022 | Damyanov | |
| 11,789,917 B2 | 10/2023 | Tal | |
| 2011/0099351 A1 * | 4/2011 | Condict | ............... G06F 3/0608 |
| | | | 711/216 |
| 2019/0236102 A1 * | 8/2019 | Wade | .................... G06F 40/205 |
| 2020/0057752 A1 | 2/2020 | Tofano | |
| 2021/0073123 A1 | 3/2021 | Huang | |
| 2023/0057692 A1 * | 2/2023 | Wong | .................... G06F 16/906 |
| 2023/0237029 A1 | 7/2023 | Tal | |
| 2023/0376451 A1 * | 11/2023 | Shilane | ................. G06F 16/116 |
| 2024/0402934 A1 | 12/2024 | Miller | |

* cited by examiner

*Primary Examiner* — Jau Shya Meng
(74) *Attorney, Agent, or Firm* — Staniford Tomita LLP

(57) ABSTRACT

A file is segmented into upper-level segments having references to lowest-level segments. Upper-level segments are aligned at fixed-size boundaries. First shards are formed. Each shard is aligned independent of an alignment of an upper-level segment and includes at least a subset of references from the upper-level segment. First shards are assigned to similarity groups within which deduplication is performed. Incremental changes are received. A virtual synthetic full is generated by segmenting new data into new upper-level segments. New upper-level segments are aligned at fixed-size boundaries and include new references to new segments of the new data. Second shards are formed. The shards include shards that include new references from the new upper-level segments and have new assignments to the similarity groups and other shards. The other shards include copies of at least subsets of references from the first shards and retain assignments to the similarity groups of the first shards.

18 Claims, 30 Drawing Sheets

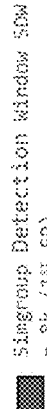
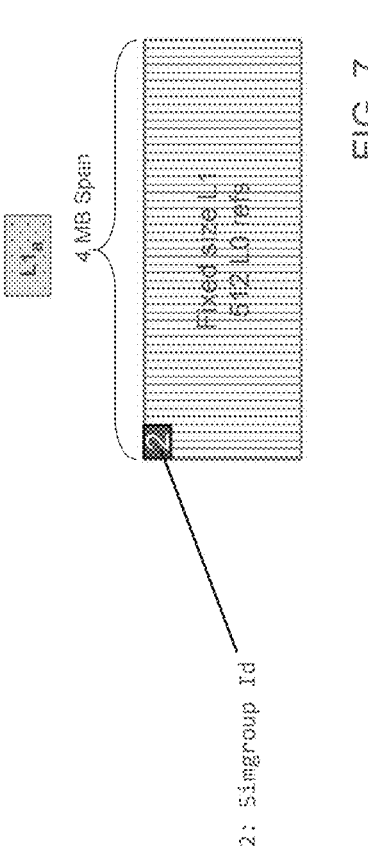
FIG. 7

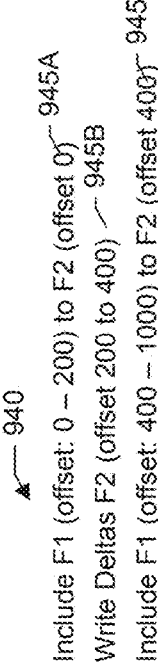
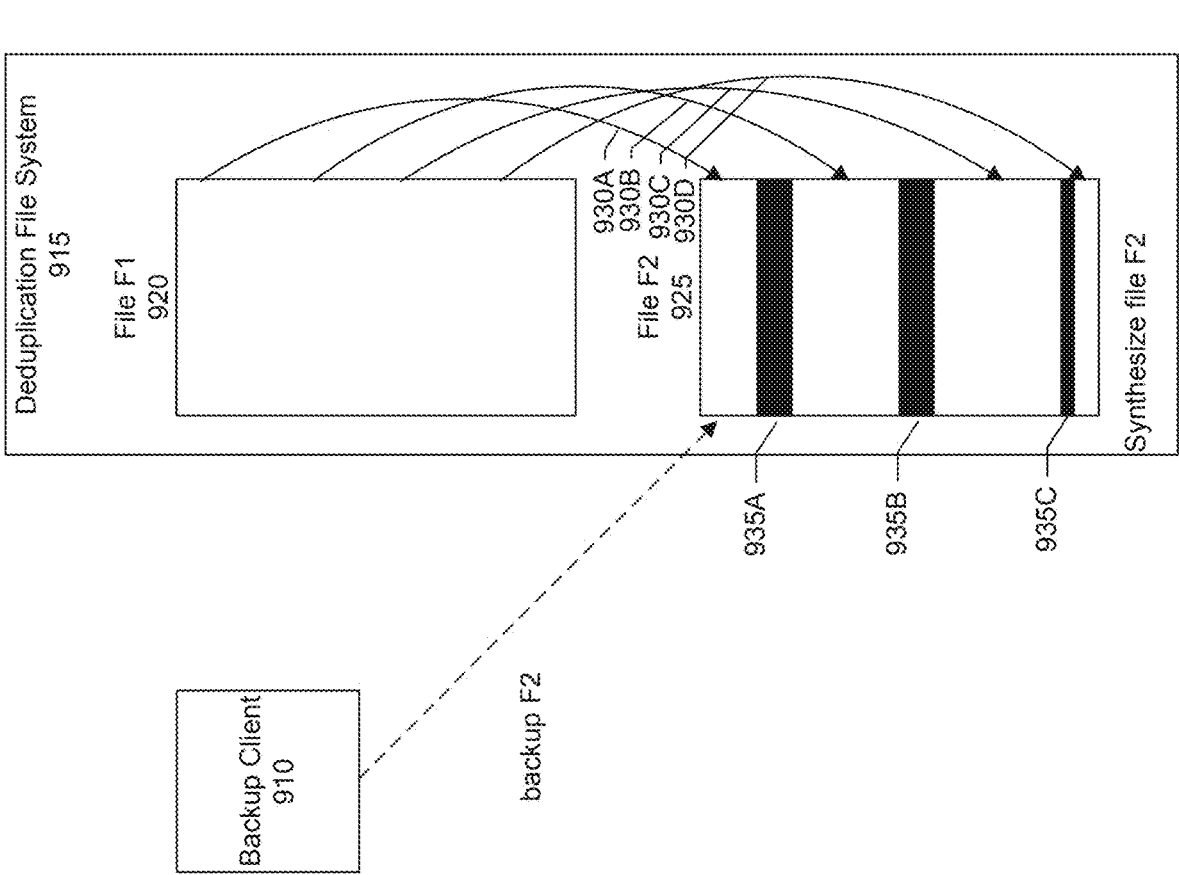
940
- Include F1 (offset: 0 – 200) to F2 (offset 0) ⏜ 945A
- Write Deltas F2 (offset 200 to 400) ⏜ 945B
- Include F1 (offset: 400 – 1000) to F2 (offset 400) ⏜ 945C
- Write Deltas F2 (1000 to 1200) ⏜ 945D
- Include F1 (offset: 1200 to 1400) to F2 (offset 1200MB) ⏜ 945E
- Write Deltas F2 (1400 to 1500) ⏜ 945F
- Include F1 (offset: 1500 to 1700) to F2 (offset 1500) ⏜ 945G
F2: 1700MB:
Virtual Synth – 1200MB
Write – 500MB (only data sent on the wire)
FIG. 9

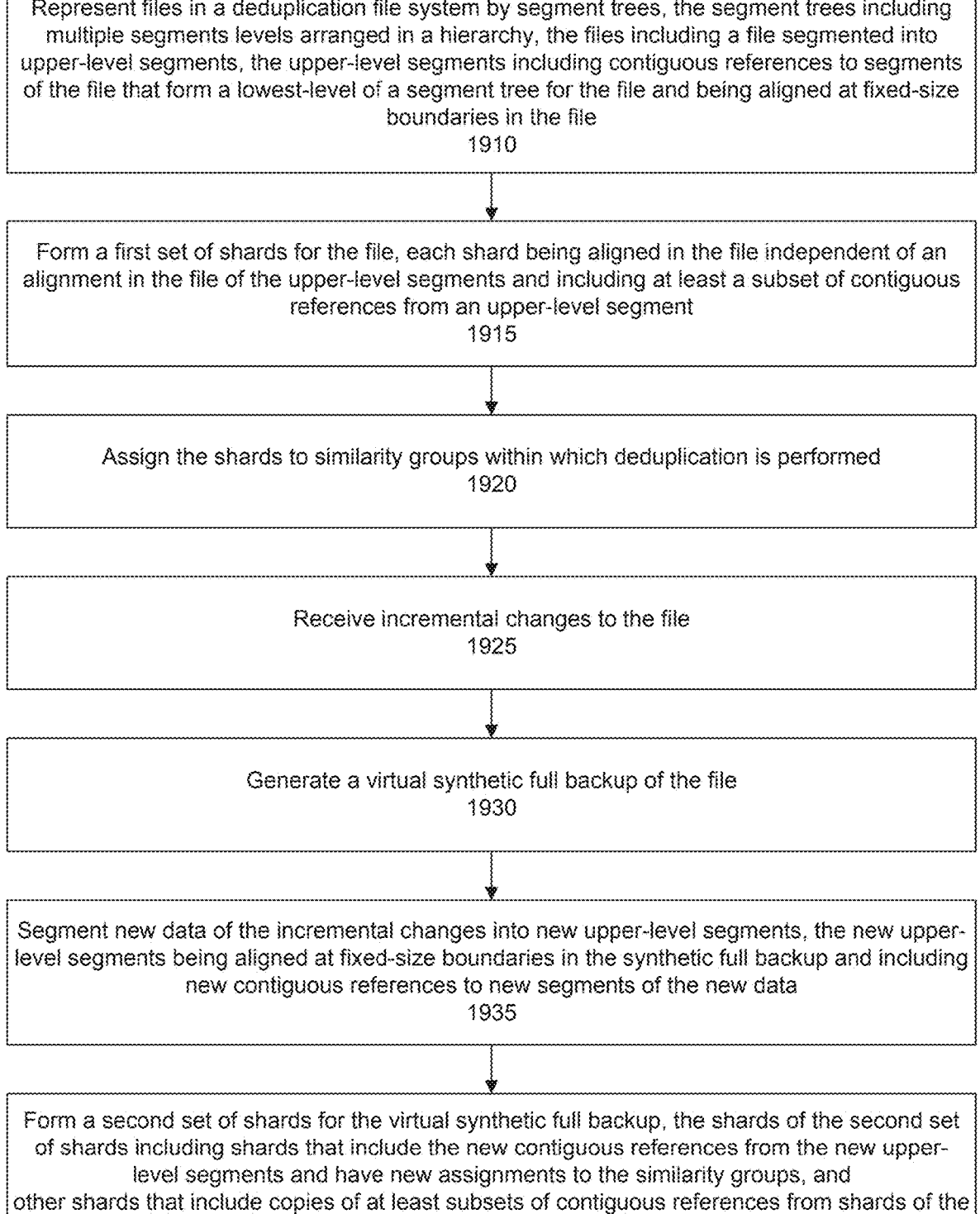

Represent files in a deduplication file system by segment trees, the segment trees including multiple segments levels arranged in a hierarchy, the files including a file segmented into upper-level segments, the upper-level segments including contiguous references to segments of the file that form a lowest-level of a segment tree for the file and being aligned at fixed-size boundaries in the file
1910

Form a first set of shards for the file, each shard being aligned in the file independent of an alignment in the file of the upper-level segments and including at least a subset of contiguous references from an upper-level segment
1915

Assign the shards to similarity groups within which deduplication is performed
1920

Receive incremental changes to the file
1925

Generate a virtual synthetic full backup of the file
1930

Segment new data of the incremental changes into new upper-level segments, the new upper-level segments being aligned at fixed-size boundaries in the synthetic full backup and including new contiguous references to new segments of the new data
1935

Form a second set of shards for the virtual synthetic full backup, the shards of the second set of shards including shards that include the new contiguous references from the new upper-level segments and have new assignments to the similarity groups, and other shards that include copies of at least subsets of contiguous references from shards of the first set of shards and retain assignments to the similarity groups of the first set of shards
1940

FIG. 19

*Window of size two:*

*Sample windows of size two:*

*Sample window of size three:*

*Sample window of size four:*

2905 Max CS Shards per L1 Segment = 32

Total Number of CS Shards = 35
Number of CS Shards to Reduce = 3

Max CS Shards per L1 Segment = 32

Identify at least three and merge
Overall data movement = 9 + 10 + 3 = 22 references Max CS Shards per L1 Segment = 32

Max CS Shards per L1 Segment = 32

Sliding window size of 2, 3 sets
Overall data movement = 9 + 10 + 3 = 22 references Max CS Shards per L1 Segment = 32

Sliding window size of 2, 3 sets
Overall data movement = 9 + 13 = 22 references

Max CS Shards per L1 Segment = 32

Sliding window size of 4
Overall data movement = 10 + 3 + 11 = 24 references

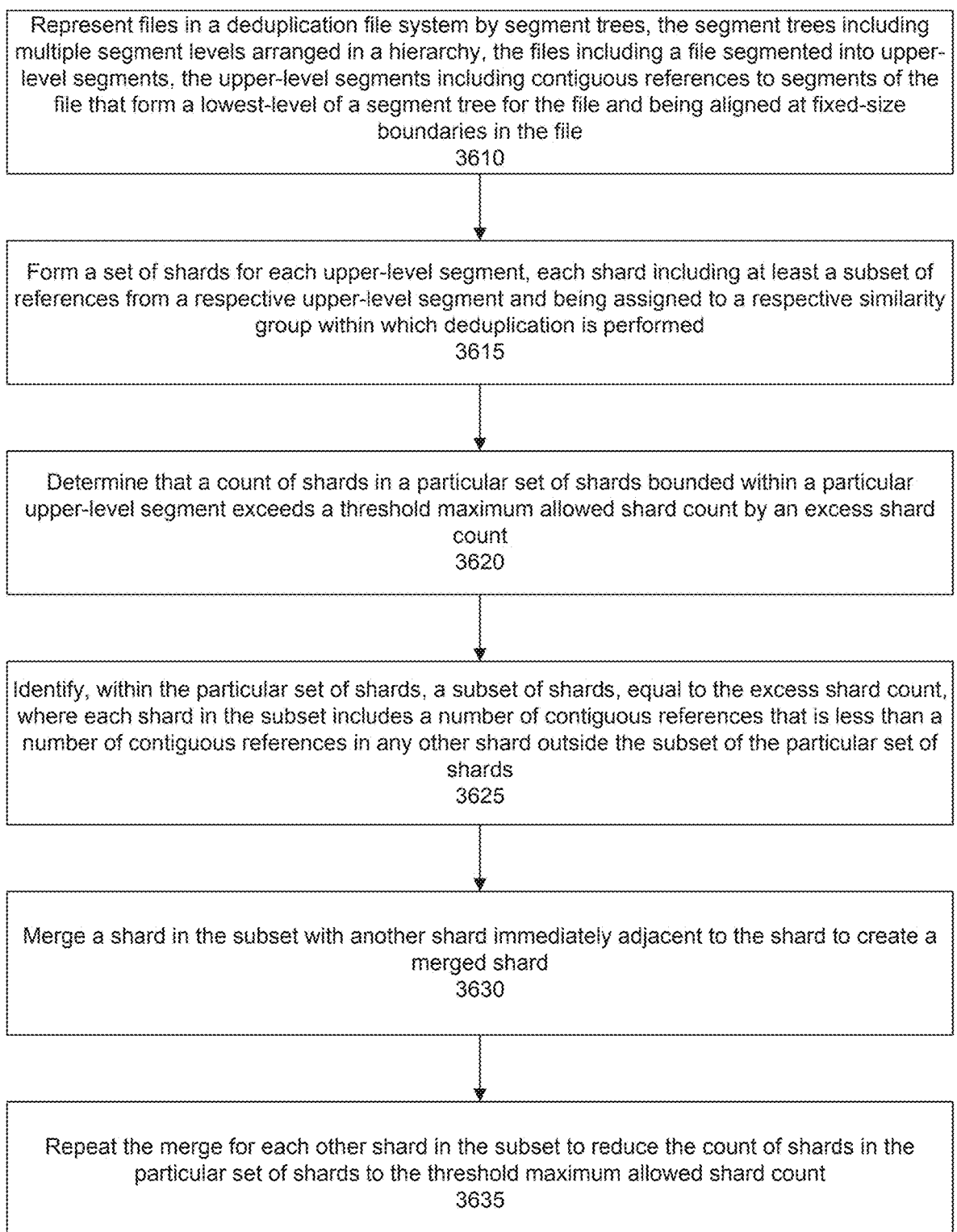

Represent files in a deduplication file system by segment trees, the segment trees including multiple segment levels arranged in a hierarchy, the files including a file segmented into upper-level segments, the upper-level segments including contiguous references to segments of the file that form a lowest-level of a segment tree for the file and being aligned at fixed-size boundaries in the file
3610

Form a set of shards for each upper-level segment, each shard including at least a subset of references from a respective upper-level segment and being assigned to a respective similarity group within which deduplication is performed
3615

Determine that a count of shards in a particular set of shards bounded within a particular upper-level segment exceeds a threshold maximum allowed shard count by an excess shard count
3620

Identify, within the particular set of shards, a subset of shards, equal to the excess shard count, where each shard in the subset includes a number of contiguous references that is less than a number of contiguous references in any other shard outside the subset of the particular set of shards
3625

Merge a shard in the subset with another shard immediately adjacent to the shard to create a merged shard
3630

Repeat the merge for each other shard in the subset to reduce the count of shards in the particular set of shards to the threshold maximum allowed shard count
3635

FORMING DATA SHARDS TO ASSIGN TO DEDUPLICATION DOMAINS IN A DEDUPLICATION FILE SYSTEM

CROSS-REFERENCE TO RELATED APPLICATIONS

This application is related to co-pending U.S. patent application Ser. No. 19/038,220, filed Jan. 27, 2025, and is incorporated herein by reference for all purposes.

TECHNICAL FIELD

The present invention relates generally to information processing systems, and more particularly to large-scale file systems.

BACKGROUND

Data block alignment refers to the process of organizing data in fixed-size units or blocks. Each block begins at a boundary that corresponds to its size. File systems rely on block alignment to manage, store, and retrieve data on storage devices such as hard drives, solid state drives (SSDs), or network storage systems.

A deduplication file system is a type of file system designed to optimize storage efficiency by eliminating redundant copies of data. It does this by identifying and storing only unique instances of data blocks or segments, while referencing any duplicates to the existing stored data. Deduplication file systems are widely used in environments with high redundancy, such as backup systems, cloud storage, and virtualized environments. Deduplication file systems seek to achieve high deduplication ratios. The deduplication ratio is a metric that quantifies the efficiency of a data deduplication process.

Data block alignment can present challenges to deduplication in deduplication file systems, especially in regards to successive generations of backups. In a large-scale file system that may manage many hundreds of millions of files, there are challenges with maintaining performance and limiting overhead while also offering features such as efficient deduplication and other features.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A file is segmented into upper-level segments having references to lowest-level segments. Upper-level segments are aligned at fixed-size boundaries. First shards are formed. Each shard is aligned independent of an alignment of an upper-level segment and includes at least a subset of references from the upper-level segment. First shards are assigned to similarity groups within which deduplication is performed. Incremental changes are received. A virtual synthetic full is generated by segmenting new data into new upper-level segments. New upper-level segments are aligned at fixed-size boundaries and include new references to new segments of the new data. Second shards are formed. The shards include shards that include new references from the new upper-level segments and have new assignments to the similarity groups and other shards. The other shards include copies of at least subsets of references from the first shards and retain assignments to the similarity groups of the first shards.

A determination may be made that a count of shards in a particular set of shards bounded within a particular upper-level segment exceeds a threshold shard count by an excess shard count. A number of shards, equal to the excess shard count, and having the fewest number of references is identified and merged into other immediately adjacent shards to reduce the count of shards to the threshold shard count.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 7 shows a similarity group detection window, according to one or more embodiments.

FIG. 9 shows a block diagram for generating a virtual synthetic full backup, according to one or more embodiments.

FIG. 19 shows a flow of generating a virtual synthetic full backup using shards, according to one or more embodiments.

FIG. 36 shows a flow for handling shard fanout, according to one or more embodiments.

DETAILED DESCRIPTION

Figure 1:
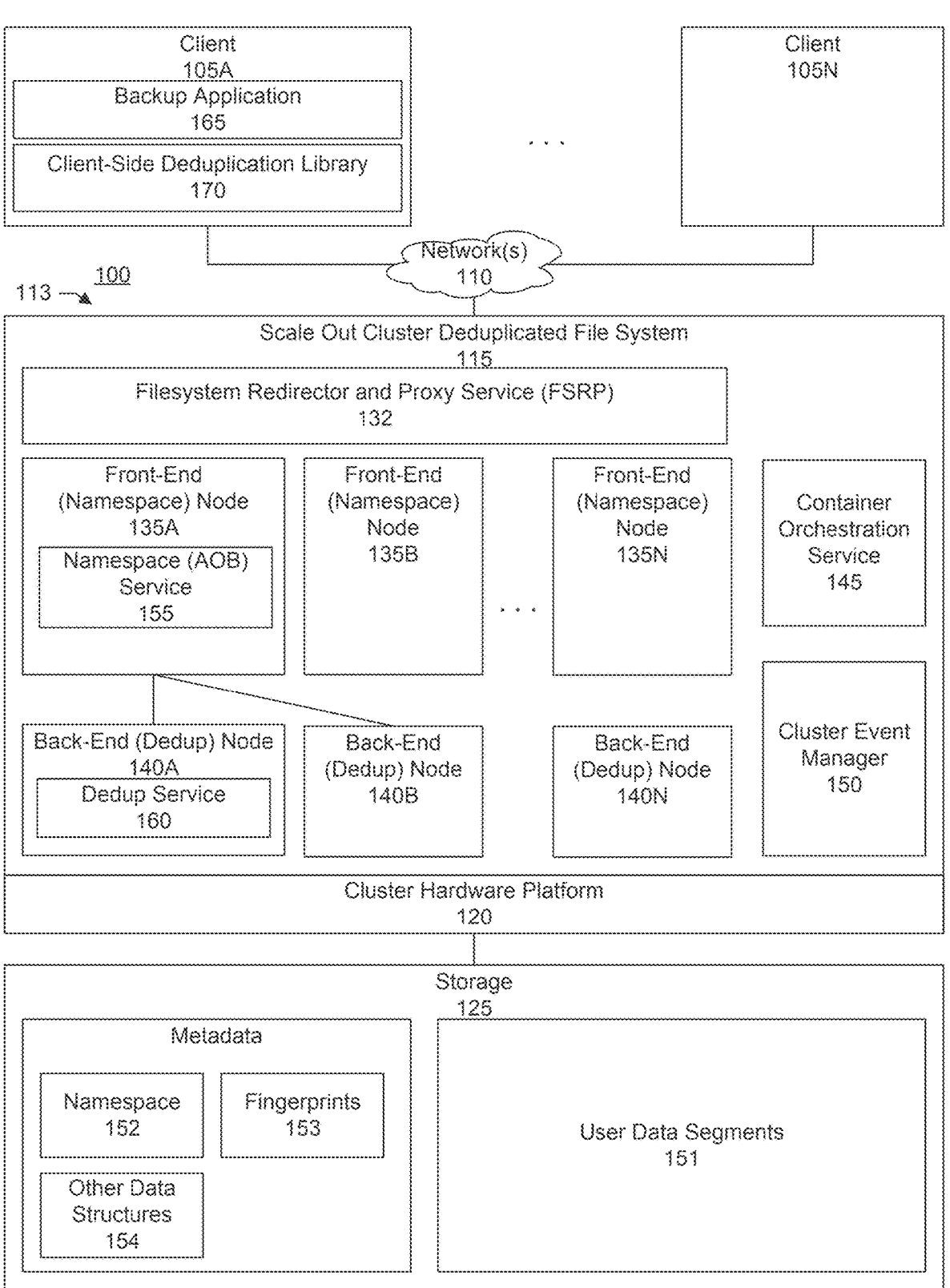
FIG. 1 shows a block diagram of an information processing system having a scale-out deduplication file system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

FIG. 1 shows a simplified block diagram of an information processing system 100 within which methods and systems for generating and using data shards to facilitate deduplication with fixed-size data chunks may be implemented. In an embodiment, there is a scale-out deduplicated file system. In this embodiment, deduplication domains are defined as similarity groups. There are multiple similarity groups and deduplication is performed within a particular similarity group. In an embodiment, there are 1024 similarity groups. The number of similarity groups, however, can vary. Systems and techniques provide for data shards as a transformative approach to address the inherent limitations posed by fixed-size data chunks. There are critical inefficiencies with using a fixed-sized chunk model (e.g., 4 megabyte (MB)) chunk for deduplication, particularly when dealing with variable size segmentation in ingest workloads. In an embodiment, the introduction of data shards, which are variable-sized, contiguous data blocks, offers a novel solution to these challenges.

The example shown in FIG. 1 includes a set of clients 105A-N connected via a network 110 to a data protection appliance 113. The data protection appliance includes a deduplication filesystem 115. The filesystem is hosted by an underlying hardware platform 120 which, in turn, is connected to a storage system 125. In an embodiment, the filesystem is a clustered or distributed filesystem such as shown in the example of FIG. 1. That is, the filesystem runs or is hosted across multiple (e.g., two or more) nodes connected to each other such as via a network or other connection scheme. In this embodiment, the data protection appliance may be referred to as a scale-out appliance, scale-out cluster, or scale-out filesystem. Depending on demand, cluster nodes or services may be dynamically scaled up or down. For example, as part of on-going operations to meet changes in demand, new nodes or new instances of a service may be added to the cluster or existing nodes or instances of a service may be removed from the cluster.

This filesystem includes a filesystem redirector and proxy service (FSRP) 132, a set of front-end nodes or services 135A-N, a set of back-end nodes or services 140A-N, a container orchestration service 145, and a cluster event manager 150.

The file system provides a way to organize data stored in a storage system and present that data to clients and applications in a logical format. The file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

In an embodiment, the front-end nodes host front-end services 155. These front-end services may be referred to as access object (AOB) services and are responsible handling namespace operations and file access requests including file and folder creation and deletion, random input/output (IO) reads and writes, fingerprinting incoming data, chunking the data, forming and handling data shards, and assigning to similarity groups. As such, the front-end nodes may be referred to as namespace nodes or access object nodes. In an embodiment, namespace nodes are cluster nodes or a microservice that collectively hosts a cluster wide namespace. A namespace service refers to a service responsible for managing namespace across the cluster.

The back-end nodes host back-end services for handling compression and deduplication 160. As such, the back-end nodes may be referred to as deduplication or dedup nodes. In an embodiment, dedup nodes are cluster nodes or a microservice that collectively hosts the backup data. A node of a cluster may be a container, server, or virtual server.

The filesystem redirector and proxy service provides an entry point for a data path of the appliance. In an embodiment, initial connection requests by clients to the data protection appliance are handled by the filesystem redirector and proxy service. The filesystem redirector and proxy service determines which namespace node or AOB node should handle the request and then redirects the request to the appropriate namespace or AOB node. In an embodiment, the determination is based on a load-balancing algorithm that attempts to distribute incoming traffic evenly across the multiple namespace or AOB nodes. FSRP also attempts to route an incoming workload protection request of a given file or directory to the same or consistent node or AOB service. File data, metadata, or both may be cached in the node or AOB service. Hence routing the request to the same node or AOB service that previously worked on the file helps to reduce cache invalidations. Namespace data is also cached as pages in the node or AOB service. So routing the request to the same node or AOB service allows for reducing namespace page invalidations.

The scale-out filesystem provides an integrated software-based solution that is highly scalable and easy to deploy in both, on-premises and in the public cloud. In a scale-out filesystem, each node runs an instance of the filesystem and a group of such nodes form the cluster providing a unified namespace and storage. In an embodiment, the filesystem includes a share-nothing architecture where capacity and performance scaling is achieved by adding storage and compute resources in terms of nodes or pods; provides global deduplication across the cluster based on similarity groups (simgrps); achieves high-availability by using an Erasure Coded storage (ObjectScale) and Kubernetes (Atlantic platform) for service availability; and provides flexible deployments including on-premise and in the public cloud.

More particularly, in an embodiment, the client-side library receives an Internet Protocol (IP) address of the namespace or AOB node identified by FSRP as part of the redirection and issues a remote procedure call (RPC) for the file system operation request to the identified front-end or AOB node. In an embodiment, any AOB can handle namespace operations and file access, but different AOBs may be assigned responsibility for different ranges of files. Based on a hash of a file handle, path, or other information associated with a file, the filesystem redirector and proxy service attempts to redirect or route associated data protection traffic to a particular access object service in a consistent manner so that future writes and/or reads of the same file are routed consistently to the same access object service. Consistent routing or redirection by FSRP enables the AOBs to cache state in memory that may be reused for other accesses. Consistent routing further helps to reduce locking, coordination, and collision issues among different AOBs because each AOB can operate on its assigned range of files independent of another AOB that may be assigned a different range of files. An AOB attempts to keep necessary state in memory for efficiency. The state, however, is globally available and can be handled by other AOB instances in case of an instance failure or other unavailability. The files or, more particularly, file handle hash ranges can be dynamically reassigned to the AOBs to maintain a balance across currently available AOBs.

In an embodiment, the file system is implemented as a set of microservices (e.g., front-end microservices and back-end microservices) running as containers. A detailed discussion of a file system as a set of microservices is provided in U.S. Pat. No. 11,893,422, issued Feb. 6, 2024. This patent is assigned to the same assignee as this patent application and is incorporated by reference along with all other references cited.

The file system uses the underlying storage system for persistence. The container orchestration service is responsible for managing the microservices such as adding a new instance of a front-end service, back-end service, or both to accommodate an increase in demand and thus ensure good performance for clients that may be accessing the file system and requesting file system operations. Alternatively, the orchestration service may remove an existing instance of a front-end service, back-end service, or both to accommodate a decrease in demand and thus reduce costs associated with resources needed to run the services. The number of instances of each microservice can change based on demand. An example of a container orchestration service is Kubernetes. Kubernetes is an open-source container-orchestration system for automating computer application deployment, scaling, and management.

A container is a virtualized computing environment to run an application program as a service or, more specifically, microservice. Thus, in an embodiment, the file system microservices, including namespace and deduplication services, run inside a virtualized environment provided by the orchestration service. The container orchestration layer can run on a single or multiple physical or virtual nodes. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

The cluster event manager communicates with the orchestration service for cluster updates and is a service that is responsible for sending events about changes in the cluster such as node addition/deletion or service addition/deletion. In an embodiment, these events detail changes to the cluster and are sent from the cluster event manager to FSRP or the front-end or namespace nodes which, in turn, forward the cluster change events to the clients.

Installed at each client is a client application such as a backup application 165 and client-side deduplication library 170. In an embodiment, the clients may be referred to as backup clients. The file system provides a backup target for data generated by the clients. In an embodiment, when the backup application seeks to perform a file system operation, the backup application issues a call (e.g., application programming interface (API) call) to the client-side deduplication library to request the file system operation. The client-side deduplication library processes and forwards the request to the data protection appliance for fulfillment. The results of the request are returned by the data protection appliance to the client-side library which, in turn, passes the results back to the requesting client application. An example of a client-side deduplication library is Data Domain Boost (DDBoost) as provided by Dell Technologies of Round Rock, Texas. Some embodiments are described in conjunction with the DDBoost protocol, Data Domain Restorer (DDR) storage system, and Data Domain file system as provided by Dell Technologies. It should be appreciated, however, that principles and aspects discussed can be applied to other file systems, file system protocols, and backup storage systems.

In an embodiment, the clients access the file system using a protocol referred to as DDBoost. Thus, the clients may be referred to as DDBoost clients. The clients (e.g., DDBoost clients) connect to the namespace nodes to perform file operations for backup jobs, restore jobs, or other data protection operations. DDBoost is a system that distributes parts of a deduplication process to the application clients, enabling client-side deduplication for faster, more efficient backup and recovery. In an embodiment, the clients use the DDBoost backup protocol to conduct backups of client data to the storage system, restore the backups from the storage system to the clients, or perform other data protection operations. The DDBoost library exposes application programming interfaces (APIs) to integrate with a Data Domain system using an optimized transport mechanism. These API interfaces exported by the DDBoost library provide mechanisms to access or manipulate the functionality of a Data Domain file system. Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. A client may run any number of different types of protocols as the file system supports multiple network protocols for accessing remote centrally stored data (e.g., Network File System (NFS), Common Internet File System (CIFS), Server Message Block (SMB), and others).

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage includes, in addition to user data segments 151, other data structures storing metadata to facilitate access to the data via file system protocols, scaling of the file system, deduplication, and other file system services and workloads. In particular, storage includes a namespace 152 and fingerprints 153, among other data structures 154. In an embodiment, the namespace is held in a tree structure and, more specifically, a B+ tree. The fingerprints correspond to unique hash values calculated from the data segments and may be stored in a fingerprint index. Further discussion is provided below.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

Figure 2:
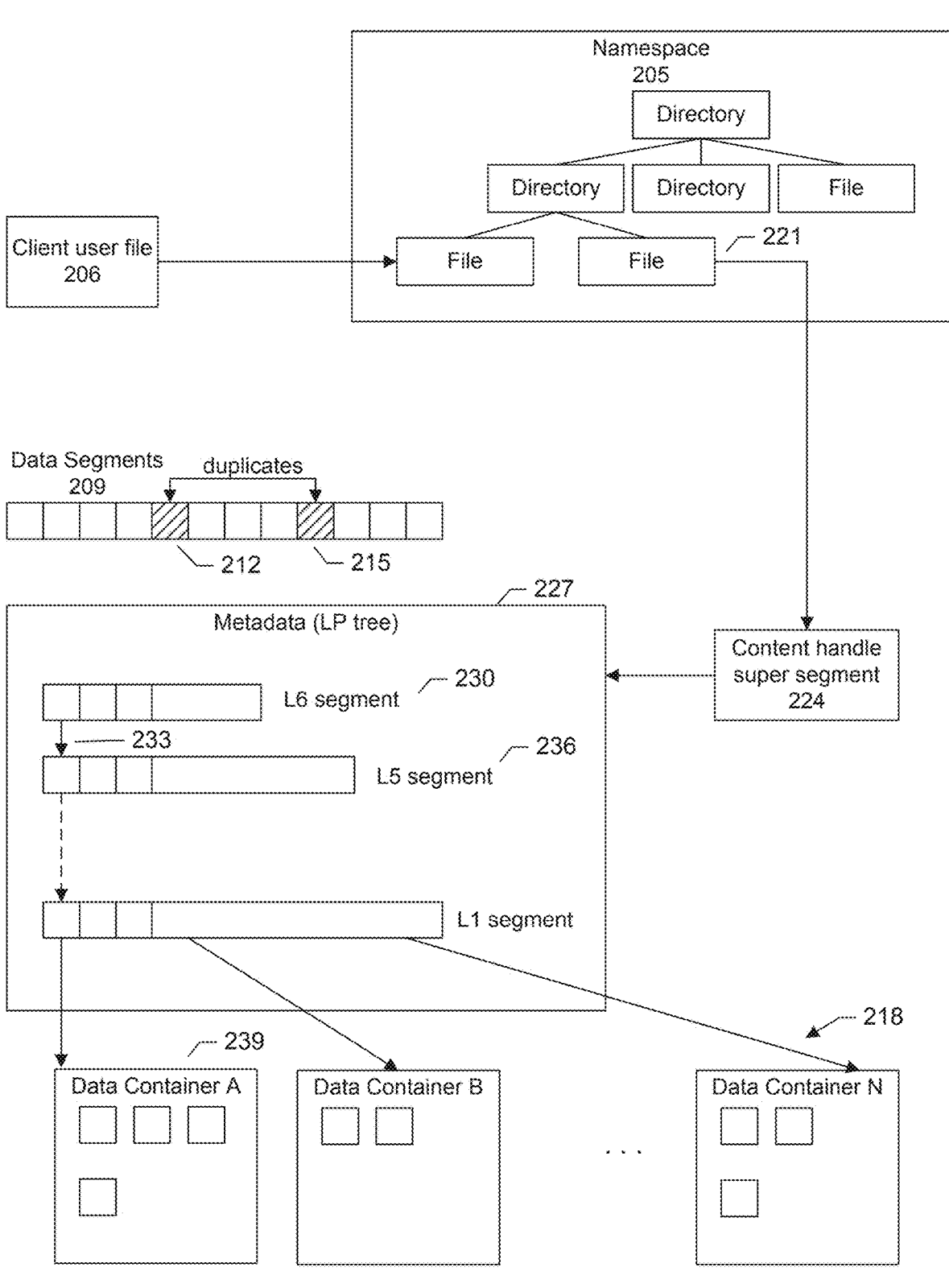
FIG. 2 shows an example of a deduplication process, according to one or more embodiments.

FIG. 2 shows a block diagram illustrating a deduplication process of the filesystem according to one or more embodiments. A deduplication filesystem is a type of filesystem that can reduce the amount of redundant data that is stored. As shown in the example of FIG. 2, the filesystem maintains a namespace 205. Further details of a filesystem namespace are provided in FIG. 3 and the discussion accompanying FIG. 3.

The process of backing up a file to the filesystem may be referred to as ingest. More particularly, as data, such as incoming client user file 206, enters the filesystem, it is segmented into data segments 209 and filtered against existing segments to remove duplicates (e.g., duplicate segments 212, 215). A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content handle 221 of the file is kept in the filesystem's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the filesystem may be represented by a tree or segment tree. The tree includes a set of segment levels arranged into a hierarchy (e.g., parent-child). Each upper-level of the tree includes one or more pointers or references to a lower-level of the tree. A last upper-level of the tree points to the actual data segments. Thus, upper-level segments store metadata while the lowest-level segments are the actual data segments. In an embodiment, a segment in an upper-level includes a fingerprint (e.g., metadata) of fingerprints of one or more segments in a next lower-level (e.g., child level) that the upper-level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

Figure 3:
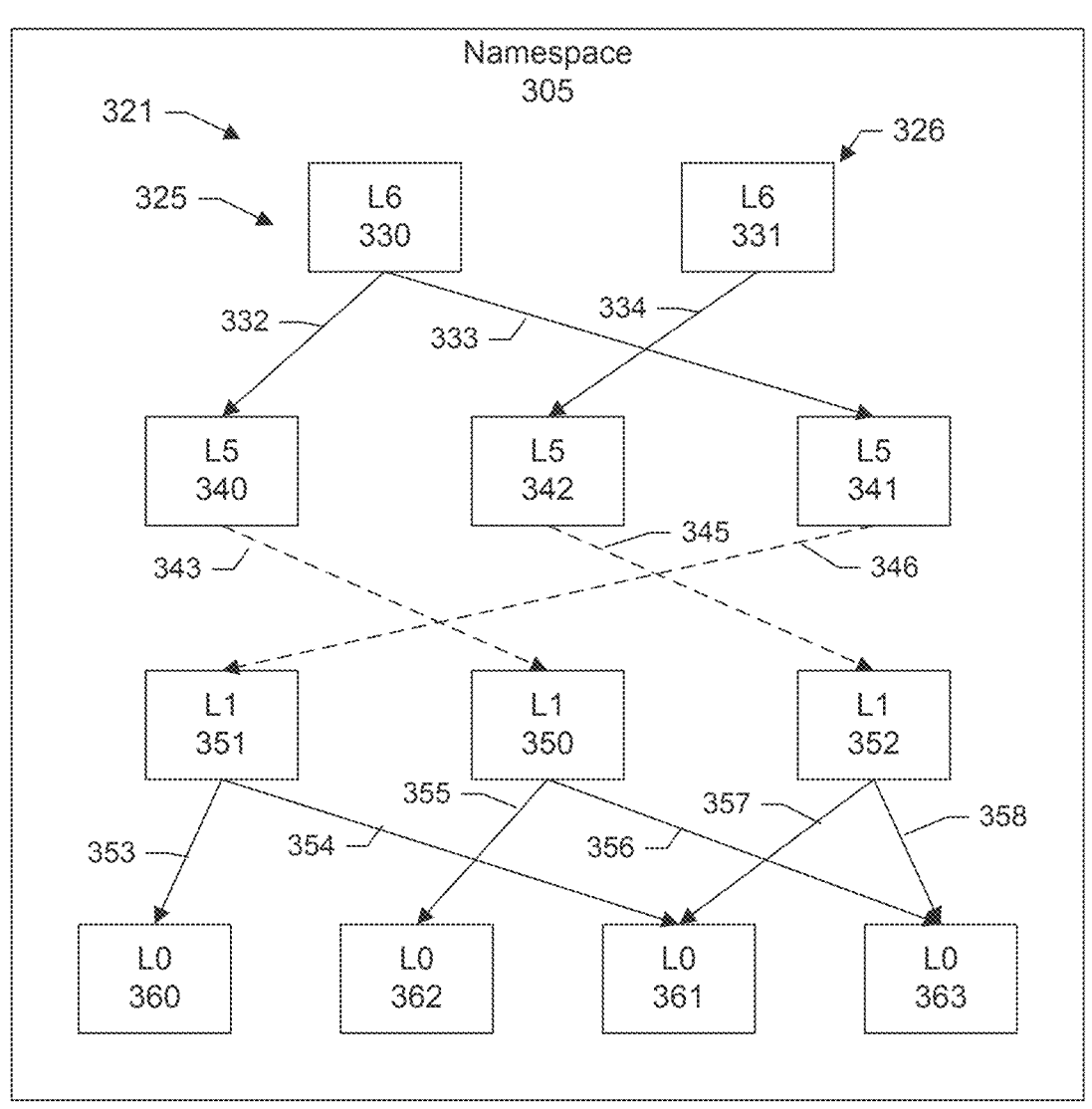
FIG. 3 shows an example of a namespace, according to one or more embodiments.

FIG. 3 shows further detail of a namespace 305 of the file system that may be used to organize the client data stored in the storage. As discussed, the namespace includes a set of trees 321 where each file in the file system is represented by a tree. The tree may be referred to as a segment tree. The tree includes a set of segment levels arranged in a hierarchy. In a specific embodiment, a tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper-level segments that store metadata (e.g., fingerprints) and may be referred to as LP segments. The lowest level segments are the L0 segments which represent actual data content of the file. An upper-level segment references one or more lower-level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower-level segments are referenced by higher-level segments.

The example shown in FIG. 3 shows segment levels L6, L5, L1, and L0. Segment levels L4, L3, and L2 have been omitted for purposes of clarity. An L6 segment forms a root or parent. Thus, in the example shown in FIG. 3, there is a first tree 325 having an L6 segment 330 and representing a first file. There is a second tree 326 having an L6 segment 331 and representing a second file.

Two or more files may share a same segment. A lower-level segment may be referenced by one or more upper-level segments. For example, a lower-level segment may be referenced by a first upper-level segment, and a second upper-level segment. The first upper-level segment may be from a first tree representing a first file. The second upper-level segment may be from a second tree representing a second file. An upper-level segment may reference one or more lower-level segments. For example, an upper-level segment may reference a first lower-level segment and a second lower-level segment.

In the example shown in FIG. 3, L6 segment 330 references L5 segments 340, 341 as shown by arrows 332, 333 from L6 330 to L5 340, 341, respectively. L6 segment 331 references L5 segment 342 as shown by an arrow 334 from L6 331 to L5 342. L5 segment 340 references an L1 segment 350 as shown by an arrow 343 from L5 340 to L1 350. L5 segment 342 references L1 segments 351, segment 352 as shown by arrows 344, arrow 345 from L5 342 to L1 351, 352, respectively. L5 segment 341 references L1 segment 351 as shown by an arrow 346 from L5 341 to L1 351. The arrows from the L5 to L1 segment level are shown in broken lines to indicate that there can be other intermediate levels between the L5 and L1 levels.

L1 segment 351 references L0 segments 360, 361 as shown by arrows 353, 354 from L1 351 to L0 360, 361, respectively. L1 segment 350 references L0 segments 362, 363 as shown by arrows 355, 356 from L1 350 to L0 362, 363, respectively. L1 segment 352 references L0 segments 361, 363 as shown by arrow 357, 358 from L1 352 to L0 361, 363, respectively.

In a specific embodiment, an upper-level segment includes a fingerprint of fingerprints of one or more lower-level segments referenced by the upper-level segment. For example, L6 segment 330 includes a finger of fingerprints of L5 segments 340, 341. L6 segment 332 includes a fingerprint of fingerprint of L5 segment 342. L5 segment 340 includes a fingerprint of fingerprint of L1 segment 350. L5 segment 342 includes a fingerprint of fingerprints of L1 segments 351, 352, and so forth.

Thus, in an embodiment, a segment is a linear set of contiguous bytes. An L0 segment is a data segment. An Lp segment is a metadata segment. An LX segment is a segment at level X in a segment tree.

As discussed, to scale capacity and performance, in an embodiment, the file system includes several microservices which scale independently. The two services relevant to the core file-system path include the access object service and deduplication object service. The access object service manages the distributed namespace and the protocol stack. It performs anchoring and fingerprinting of incoming data, divides up the data into chunks and determines the simgrp for each chunk of data. A simgrp is a data partition that enables the spreading of the data across multiple nodes and deduplication object services. The AOB routes the data chunk to the appropriate DOB service based on the simgrp.

The deduplication (dedup) object service is a service running on a node in the cluster and is responsible for one or more similarity groups. This service is responsible for deduplicating and compressing the incoming data. The data is packed into containers, and containers are further packed into blobs that are 16 MB objects written to Object Scale.

To load-balance file operations across the cluster, the file system redirector and proxy (FSRP) service routes files across all the AOB services. The routing is done by calculating a hash on the file handle, which helps to ensure that the same file is routed to the same AOB service.

Files in the file system are represented by a hierarchical tree structure called segment trees (Merkle tree). The segment trees include multiple segment levels. A segment tree may be referred to as the Lp tree (level tree). The L1 nodes of the tree refer to L0 data segments by a fingerprint (hash and other metadata). The access object service processes incoming data from a client to generate segments (e.g., fixed or variable 8 kilobyte (KB) in size) that are the L0s of the tree, and then the upper-levels of the tree reference lower-levels.

Figures 4, 5:
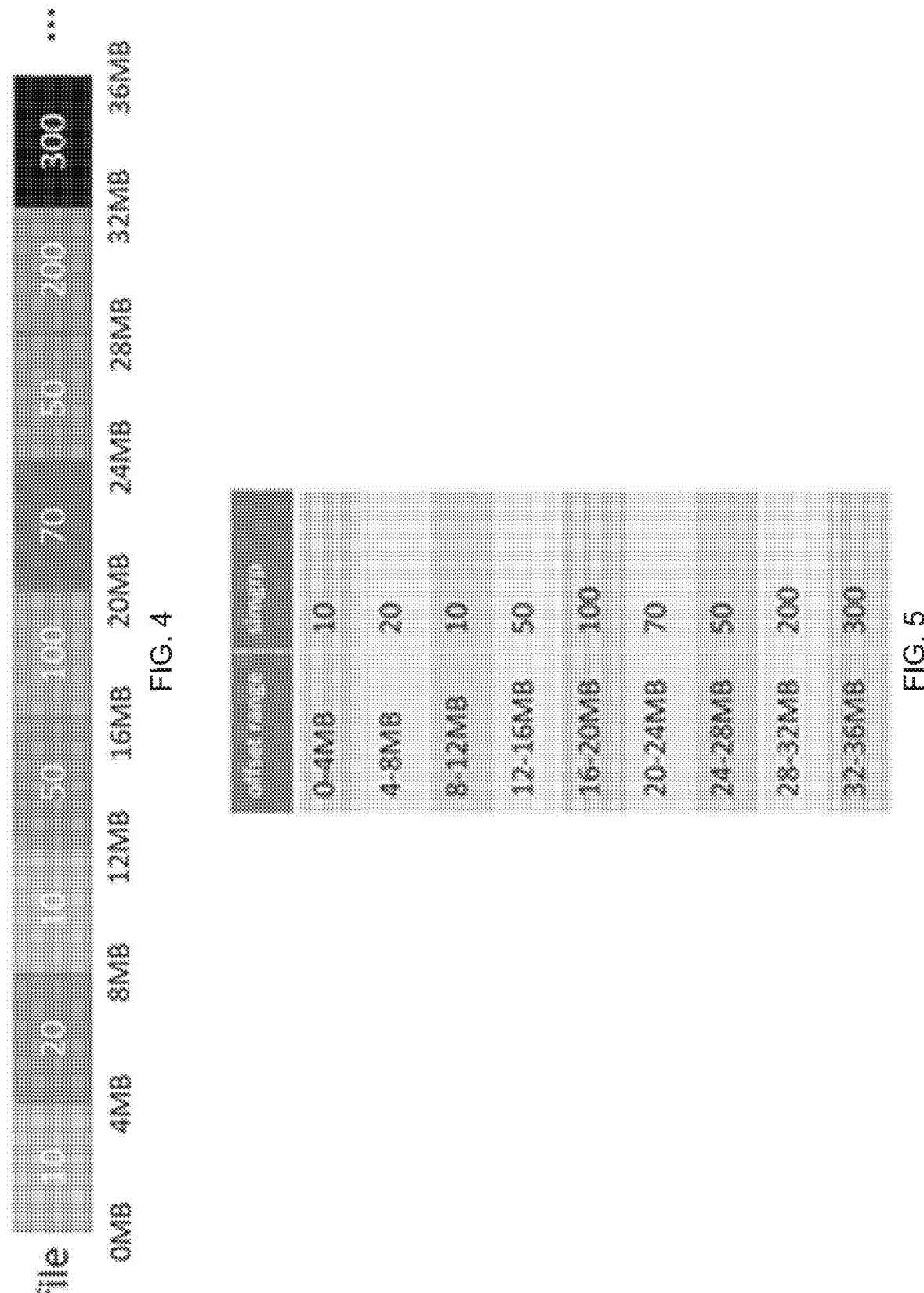
FIG. 4 shows a file being divided into chunks and the chunks being mapped to similarity groups, according to one or more embodiments.
FIG. 5 shows the similarity group mapping in a tabular form, according to one or more embodiments.

FIGS. 4 and 5 show block diagrams of mapping a file to similarity groups. FIG. 4 shows a file having been divided into segments or chunks and the chunks mapped to similarity groups. FIG. 5 shows the information from FIG. 4 in a tabular form. In an embodiment, the file is divided into fixed-size chunks and each chunk is assigned a simgrp (which is essentially a deduplication domain) from the available set of simgrps. Deduplication occurs within a deduplication domain or simgrp, but not across simgrps.

A single file could potentially get mapped to all simgrps. The simgrp for a file chunk is determined based on the contents of the chunk. The mapping of chunk to simgrp is encoded in the metadata of the file, specifically in the metadata segments forming the Merkle tree for a file. In an embodiment, the data chunks are mapped to L1s (level one in a multi-level tree) spanning megabytes of content, and they are directed to the DOB responsible for deduplication, compression and storage of the data to the underlying shared storage system.

Specifically, a first column of the table lists offset ranges corresponding to the chunks into which the file has been divided. A second column of the table lists the similarity groups the offset ranges have been mapped to based on the contents of the respective chunks. In this example, upon file ingest, a chunking scheme breaks the incoming file stream into 4 MB chunks, and an algorithm is applied to the chunks to identify and group similar chunks together.

Specifically, a first entry of the table indicates that a first offset range (e.g., 0-4 MB) corresponding to a first chunk has been mapped to similarity group 10. A second entry of the table indicates that a second offset range (e.g., 4-8 MB) corresponding to a second chunk has been mapped to similarity group 20. A third entry of the table indicates that a third offset range (e.g., 8-12 MB) corresponding to a third chunk has been mapped to similarity group 10. A fourth entry of the table indicates that a fourth offset range (e.g., 12-16 MB) corresponding to a fourth chunk has been mapped to similarity group 50, and so forth.

As discussed, deduplication object services are assigned different subsets of similarity groups to handle. Thus, an incoming stream associated with the ingest of a file can potentially be spread out across multiple deduplication object services for processing. For example, chunks of a file belonging to a first similarity group may be sent to a first deduplication object service to handle. Chunks of the file belonging to a second similarity group may be sent to a second deduplication object service, different from the first deduplication object service, to handle.

Figure 6:
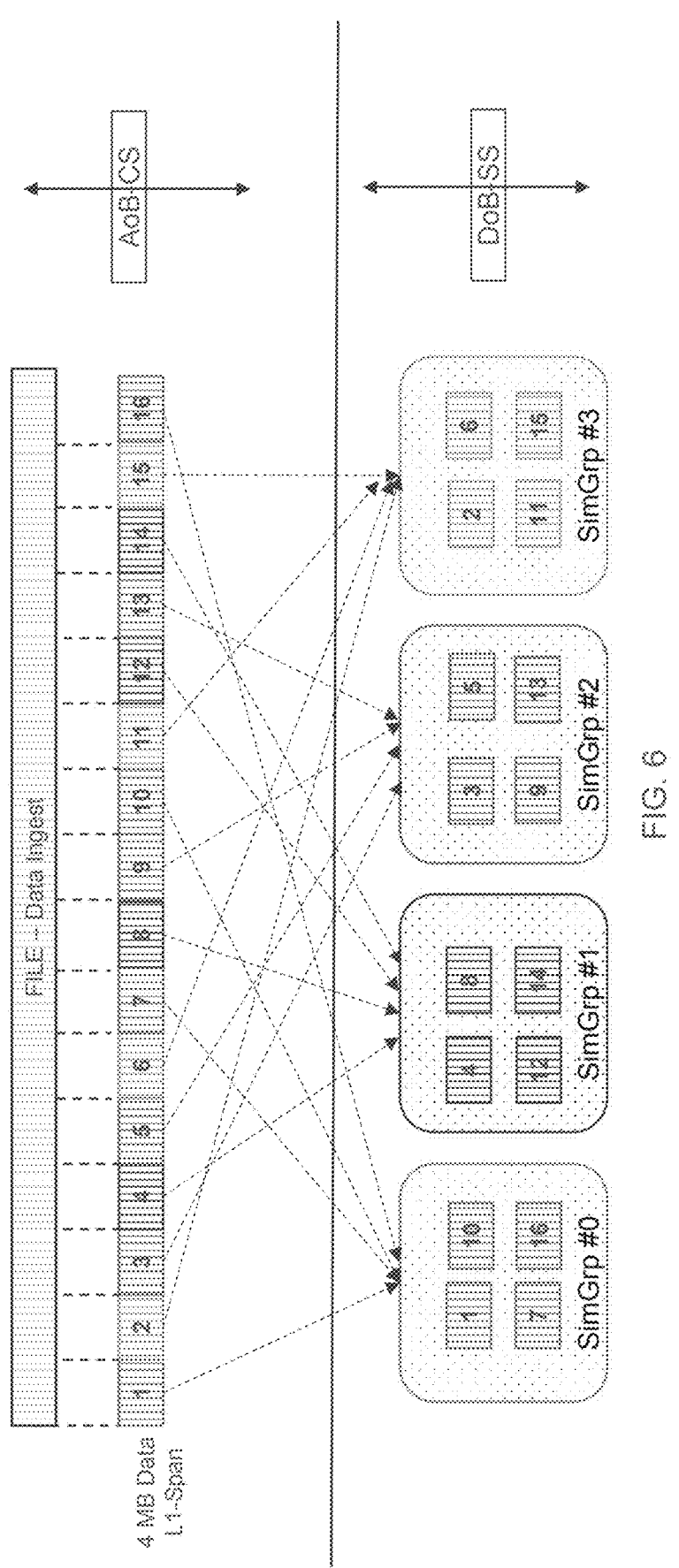
FIG. 6 shows an ingest of file into fixed size segments assigned to similarity groups, according to one or more embodiments.

FIG. 6 shows another block diagram of a file, upon ingest, being segmented by an access object service into fixed-size chunks of 4 MB to form an L1 segment where the L1 is then assigned to a similarity group. The L1 segment is sent to a deduplication object service having responsibility for the similarity group. In the example shown in FIG. 6, the deduplication object service is responsible for simgroups 0-3. The file has been segmented into L1s 1-16. L1s identified as 1, 10, 7, and 16 are assigned to simgroup 0. L1s identified as 4, 8, 12, and 14 are assigned to simgroup 1, and so forth.

FIG. 7 shows a block diagram for determining simgroup id. In an embodiment, an L1 data segment has a 4 MB span and contains a set of L0 references or fingerprints organized in a linear or consecutive arrangement. Simgroup id is determined based on L0 references or fingerprints. In an embodiment, a simgroup detection window (SDW) defines a number of initial L0 refs used to determine simgroup id (Min: 1, Max: max_refs_in_L1). In an embodiment, an algorithm uses a first fingerprint (SHA1) value representing a first 8 k data of 4 MB chunk (SDW=8K (1 FP)) to determine the similarity group id. In other words, in an embodiment, there is a similarity group-based architecture. In this embodiment, data chunks are defined as 4 MB and represented by an L1 segment in a segment tree. There is a simgroup id per 4 MB data chunk and the simgroup ID is generated based on SHA1 value of a first 8K data in 4 MB data chunk. In an embodiment, the window moves along an input data stream during the ingestion process to make the similarity group assignments.

When the incoming data is anchored at fixed-length boundaries to form segments of fixed size, the backups are called fixed size segmentation (FSS) backups. In an embodiment, for fixed size segmentation backup, an L0 data segment size is fixed at 8K. Typically, these are virtual machine backups. When the incoming data is anchored at variable-length boundaries to form segments of variable size, the backups are called variable size segmentation (VSS) backups. Typically, these are filesystem backups. In an embodiment, for variable size segmentation backups, an L0 data segment size is variable, but averages 8 k.

In some cases, there are challenges with the fixed-size 4 MB data chunk (L1 level span in a segment tree) approach in two specific use cases when the ingest workload is not fixed sized block based, i.e., when the ingest workload is generating VSS backups.

Figure 8:
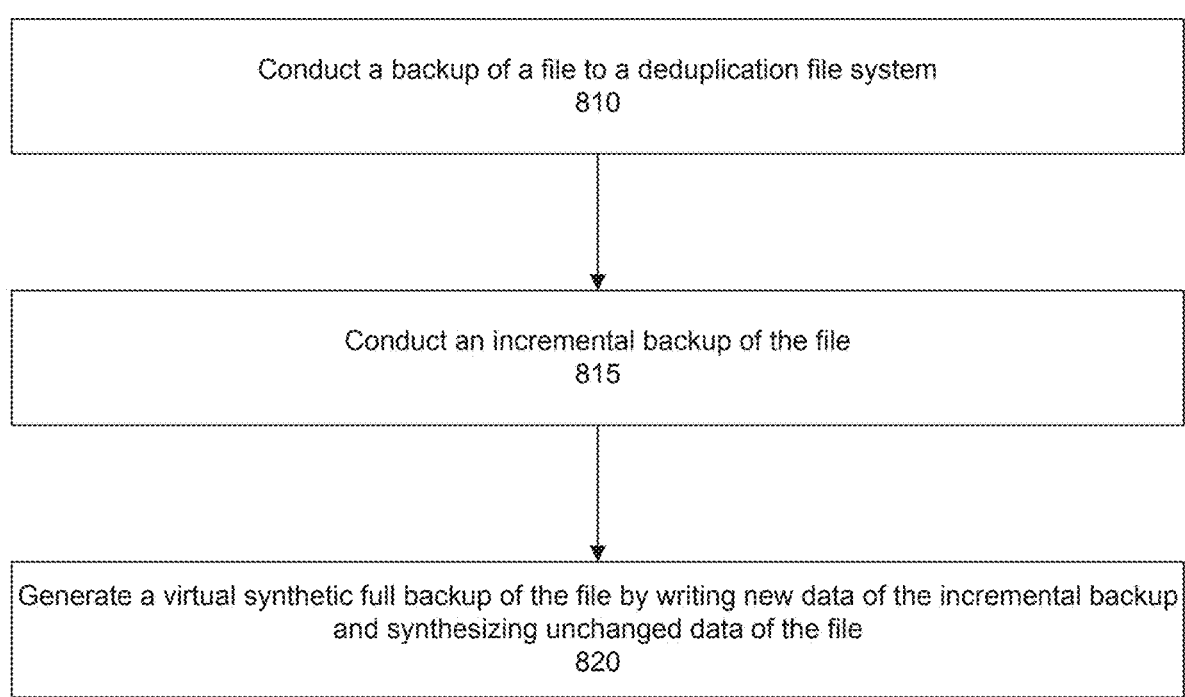
FIG. 8 shows a flow for a virtual synthetic full backup, according to one or more embodiments.

The first challenge is the inefficiency in handling virtual synthetics (VS) workloads. FIG. 8 shows a flow of a virtual synthetic operation to generate a virtual synthetic full backup of a file. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 810, a backup is conducted of a file to a deduplication file system. In a step 815, a subsequent incremental backup is conducted of the file to the deduplication file system. The incremental backup includes the changes or new data since the last or previous backup. In a step 820, a virtual synthetic full backup of the file is generated by writing new data of the incremental backup and synthesizing unchanged data of the file from the last backup. In an embodiment, synthesizing involves metadata copying or copying data references (rather than copying actual data) from one or more than one file previously backed up. The metadata contains an indirect pointer to the actual data on disk and metadata copying can be accomplished much faster than actual data copying while also reducing the amount of redundant data that is stored.

FIG. 9 shows a further example of creating a virtual synthetic full backup of a file. In this example, there is a backup client 910 and a deduplication file system 915. First file F1 920 is backed up first from the client to the deduplication file system. A subsequent backup of a second file F2 925 to the deduplication file system may be an incremental backup and includes including or synthesizing data from F1 and writing new data. The include operation copies references from the base file to a virtual synthetic full file. That is, the include operation copies the metadata (data references or copy-refs) instead of data. Conducting a copy of references is much faster than conducting a data copy. In this example first file F1 is the base file. Arrows 930A-D pointing from base file F1 to the unfilled regions of file F2 are shown to graphically represent the include operations from base file F1. Filled regions 935A-C of file F2 represent the write operations of the deltas or changes from base file F1.

Thus, the process to synthesize or create F2 from base file F1 involves a series 940 of include and write operations. In an embodiment, requests for the include and write operations may be issued from the client, such as by the client backup application or client-side deduplication library. In particular, a first operation 945A includes an include operation that identifies a first region by an offset and length within F1 (e.g., offset 0-200) and a location within F2 (e.g., offset 0) at which the first region is to start. As shown in the example of FIG. 9, the first operation includes synthesizing 200 MB.

A second operation 945B includes a write operation that identifies a second region by an offset and length within F2 (e.g., offset 200 to 400) at which deltas are written. The second operation thus includes writing 200 MB.

A third operation 945C includes a include operation that identifies a third region by an offset and length within F1 (e.g., offset 400-1000) and a location within F2 (e.g., offset 400) at which the third region is to start. The third operation thus includes synthesizing 600 MB.

A fourth operation 945D includes a write operation that identifies a fourth region by an offset and length within F2 (e.g., offset 1000 to 1200) at which deltas are written. The fourth operation thus includes writing 200 MB.

A fifth operation 945E includes an include operation that identifies a fifth region by an offset and length within F1 (e.g., offset 1200-1400) and a location within F2 (e.g., offset 1200) at which the fifth region is to start. The fifth operation thus includes synthesizing 200 MB.

A sixth operation 945F includes a write operation that identifies a sixth region by an offset and length within F2 (e.g., offset 1400 to 1500) at which deltas are written. The sixth operation thus includes writing 100 MB.

A seventh operation 945G includes an include operation that identifies a seventh region by an offset and length within F1 (e.g., offset 1500-1700) and a location within F2 (e.g., offset 1500) at which the seventh region is to start. The seventh operation thus includes synthesizing 200 MB.

A resulting size of F2 is 1700 MB (e.g., 200+200+600+200+200+100+200=1700). However, 1200 MB were synthesized (e.g., 200+600+200+200=1200); and only 500 MB was written (e.g., 200+200+100=500). File F2 may be referred to as virtual synthetic full backup or an incremental full.

Thus, in an embodiment, synthetic backups or virtual synthetic backups are backups created using one or more previous backups. An "include" operation is an operation to include references from one or more previous backup files. A basefile refers to a source file for an include operation.

The use of virtual synthetics can allow data determined to be unchanged to be synthesized from the previous base file. Virtual synthetic operations are used to "stitch" data from the previous backup file or multiple previous backup files already on the deduplication file system with the changes or deltas to create the full image. A virtual synthetic full backup file appears as a regular file to a user or application. However, the file is physically stored at the backup storage or file system in a form or representation that includes references to one or more previously stored files, which may be referred to as base files, and synthesis metadata. Such metadata may include identifications of one or more base files on which a virtual synthetic file is based, relationship information of the virtual synthetic file to the one or more base files, location information identifying relevant regions of the one or more base files and corresponding locations in the virtual synthetic file, and other metadata.

During an "include" operation in a virtual synthetic workflow, efficiency can be impacted when the operation spans more than one L1 segment. With a similarity group based architecture, where a simgroup ID is assigned to each L1, this results in a performance overhead and a loss of deduplication efficiency due to the necessity of reading and copying data. In fact, in the worst case, virtual synthetics fails in reducing the amount of redundant data as most of the copy is a data copy instead of a metadata copy. It is desirable to improve data segmentation and deduplication in data protection appliances.

There is a need to improve virtual synthetic operations in a similarity group-based architecture with fixed data chunks. Virtual synthetic creates synthesized backups by executing an "include" operation from one or more base files. Rather than copying data, "include" operations copy the metadata, specifically data references or copy-refs (metadata). However, with the association of a simgroup per L1, metadata copying is not feasible in most cases. This leads to a considerable performance problem as it necessitates reading the data and rewriting it with the appropriate simgroup. This problem is particularly challenging to address or design with a fixed size data chunk, especially when "includes" are not aligned with 4 MB (L1).

The second challenge is the data shift problem in filesystem backups, which can potentially result in a complete loss of deduplication. This issue arises particularly when the similarity group ID is determined by a few initial segment references in the L1 segment. In an embodiment, an algorithm determines the simgroup ID based on the first reference of each L1 segment, where the first word of the L1 fingerprint is modded by 1024 (number of simgroup).

In filesystem backups, data shifts frequently occur between different generations of backups. These shifts result from data changes, such as the insertion of new data, modification of existing data, or deletion of data. Even minor data changes can cause significant shifts, particularly when changes occur at the lower offsets of a file.

Figure 10:
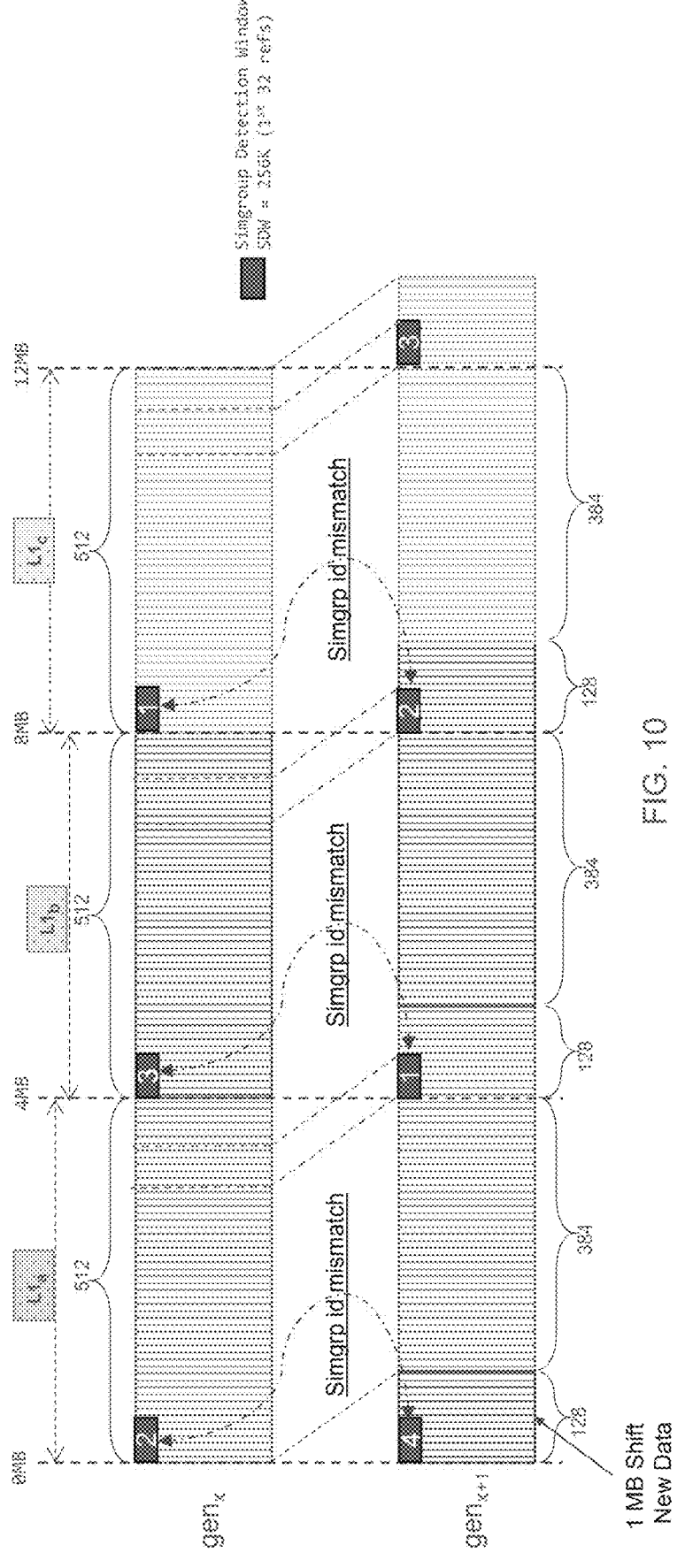
FIG. 10 shows an example of a data shift causing a loss in deduplication, according to one or more embodiments.

FIG. 10 shows an example of a data shift. In this example, there are two backup generations with a 1 MB data shift, leading to a complete mismatch in simgroup IDs between the backups. As a result, similar data is assigned to different similarity groups, causing a loss in deduplication efficiency.

More specifically, a first generation ($gen_X$) backup includes a file having been segmented and organized into a set of fixed-size units. In an embodiment, these fixed-size units may be referred to as L1 segments, e.g., $L1_a$-$L1_c$. Each L1 segment is aligned to a fixed boundary on the storage medium. Thus, the starting position of each L1 segment is a multiple of the block size. In an embodiment, the L1 segments have a size of 4 MB and thus each L1 is aligned to a 4 MB boundary on disk. Fixed-size block alignment facilities file system management by standardizing data placement and retrieval. Aligning data to fixed block sizes corresponds to how storage devices (e.g., HDDs, SSDs) are designed to read/write data.

An L1 segment holds a contiguous set of references to L0 data segments that form the lowest-level of the segment tree of the file. These references are shown in the figure using a pattern of vertical lines. In an embodiment, a simgroup assignment process includes a simgroup detection window that examines an initial set of references (e.g., first 32 references) in an L1 segment to determine a simgroup that the L1 should be assigned to. For the first generation backup of the file, first segment $L1_a$ has been assigned to simgroup ID 2 based on a subset of references spanning a beginning portion of the first segment $L1_a$. Second segment $L1_b$ has been assigned to simgroup ID 3 based on a subset of references spanning a beginning portion of the second segment $L1_b$. Third segment L1, has been assigned to simgroup ID 1 based on a subset of references spanning a beginning portion of the third segment $L1_c$.

A second generation ($gen_{X+1}$) backup of the file includes a 1 MB unit of new data that has been written at a beginning of the file. The writing of the new 1 MB unit of data has caused a data shift to the right and across the L1 boundaries. As discussed, the simgroup assignment process examines only an initial set of references in an L1 segment to determine a simgroup that the L1 should be assigned to. In the example shown in FIG. 8, for the second generation backup of the file, first segment $L1_a$ has been assigned to simgroup ID 4 based on a subset of references spanning a beginning portion of the first segment $L1_a$, which includes the new 1 MB unit of data, even though only a small amount of data has changed (e.g., 128 kilobytes (KB) versus 384 KB). The shift in data further results in a ripple effect of second $L1_b$ and third $L1_c$ having new similarity group assignments despite the lack of new data being written to their corresponding locations. For example, second segment $L1_b$ has a new assignment to simgroup ID 1 based on the 128 KB of data added to a beginning of first segment $L1_a$ which has shifted references at an ending portion of first segment $L1_a$ across the 4 MB boundary. Similarly, third segment $L1_c$ has a new assignment to simgroup ID 2 based on the 128 KB of data from second segment $L1_b$ shifted across the 8 MB boundary. The simgroup mismatches cause a loss of deduplication efficiency.

FIG. 10 thus shows the loss of deduplication with data shift in variable size segmentation backups when simgroup ID assignment is based on a first fingerprint of data chunk. One or more data shifts results in creating new L1s in new generation backups. These resulting new L1s have different simgroup ID assignments than the base file. The loss in deduplication efficiency is especially prominent when the data shift is at the start of the backup.

Figure 11:
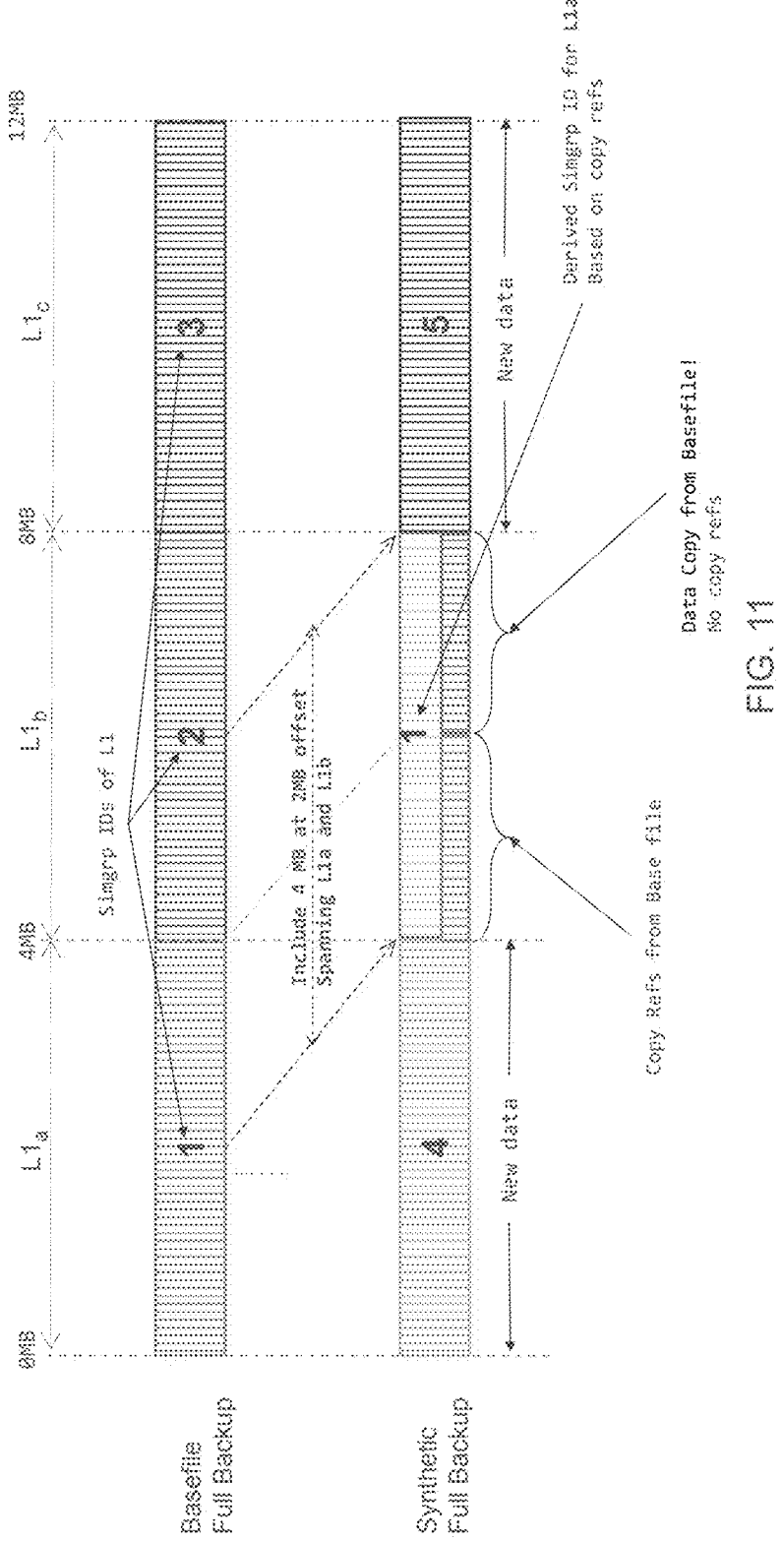
FIG. 11 shows an example of a virtual synthetic include operation with fixed size segments, according to one or more embodiments.

FIG. 11 shows a block diagram of a virtual synthetic include operation on fixed-size L1 segments where the include operation spans multiple L1 segments. As discussed, virtual synthetics creates synthesized backups by including metadata from one or more base files. Include operations copy the metadata (data references) instead of data. However, the simgroup per L1 association results in an inability to copy references in most cases. This can lead to serious performance issues with dedupe loss. The reason is due to a fixed-size data chunk and the problem is particularly acute when include operations are not 4 MB (L1) aligned.

Specifically, the example in FIG. 11 shows a basefile from a full backup. The basefile has been segmented into $L1_a$, $L1_b$, and $L1_c$ segments that are aligned at 4 MB boundaries. Segment $L1_a$ has been assigned to simgroup ID 1. Segment $L1_b$ has been assigned to simgroup ID 2. Segment $L1_c$ has been assigned to simgroup ID 3.

During a subsequent incremental backup, new data for the file has been received. A synthetic full backup is generated based on the previous full backup and incremental backup.

The synthetic full backup may be referred to as a destination or target file. Generating the synthetic full backup includes forming new L1 segments corresponding to the writing of the new data at their specified locations and assigning the new L1 segments to simgroups.

For example, a new $L1_a$ segment has been assigned to simgroup ID 4. A new $L1_c$ segment has been assigned to simgroup ID 5. An include operation of 4 MB at a 2 MB offset copies references from the base file. The operation spans the $L1_a$ and $L1_b$ segments. However, because of the data shift by the writing of new data, only a portion of the operation results in a reference or metadata copy from the base file with another portion being a data copy from the base file because segment $L1_b$ receives a new assignment to simgroup ID 1.

In other words, having derived a simgroup assignment of new segment $L1_b$ for the synthetic full backup as being simgroup ID 1 (based on the references in the basefile copied at a starting offset of 2 MB), the references starting at the 4 MB offset in the basefile (and associated with simgroup ID 2) cannot be copied as-is because the corresponding data resides in, belongs to, or is associated with a different similarity group, e.g., simgroup ID 2. This mismatch in similarity groups or new reassignment to simgroup ID 1 then results in conducting a copy of data rather than a copy of metadata. Conducting a data copy requires a greater amount of compute resources than a metadata copy. The reassignment to a different similarity group causes a loss in deduplication.

Figure 12:
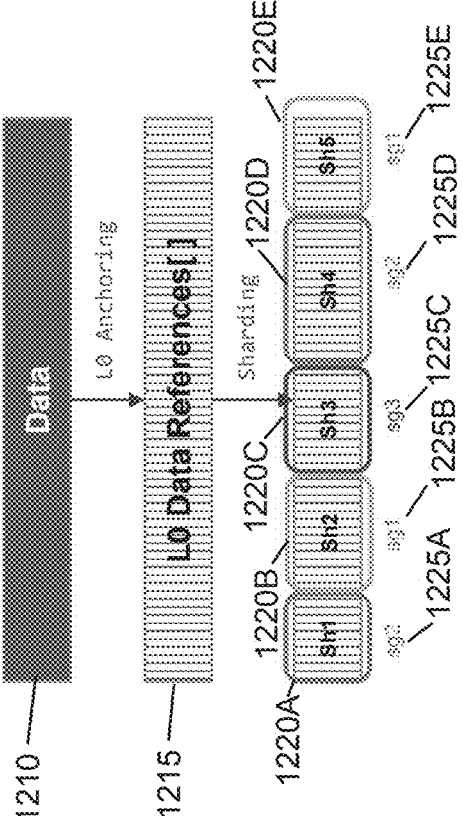
FIG. 12 shows an example of data shards, according to one or more embodiments.

FIG. 12 shows a block diagram of data shards that may be used to address deduplication loss because of data shifts. In the example shown in FIG. 12, there is a chunk of data 1210 to which an L0 anchoring algorithm has been applied to generate a contiguous set of L0 data references 1215 (e.g., fingerprint of data). A sharding algorithm is applied to the contiguous set of L0 data references to generate or anchor a set of shards 1220A-E. Each shard (Sh) includes a subset, subgroup, or collection of the contiguous L0 data references. Anchoring is a process of locating a boundary of shard based on criterion.

In an embodiment, forming a shard includes applying an anchoring algorithm to a stream of input data having contiguous, linear, sequential, or consecutive L0 references; and upon satisfying the criterion, closing (e.g., anchoring) the shard. In an embodiment, an anchoring algorithm includes defining a minimum shard size, a maximum shard size, and anchoring a shard when a size of the shard reaches a randomly generated number between the minimum and maximum shard size. Any competent anchoring algorithm, however, may be used. U.S. Pat. No. 9,823,975, issued Nov. 21, 2017, includes a discussion of some anchoring techniques, is assigned to the same assignee as this patent application, and is incorporated by reference. The shards are assigned to similarity groups (sg) 1225A-E based on examining initial references collected into the shards.

A shard may be referred to as a content store (CS) shard. In an embodiment, a CS shard is a logical construct or data structure in the deduplication filesystem. A shard defines a contiguous chunk of data with the same simgroup ID; can span the L1 boundary; includes a set of contiguous or consecutive L0 data segment references; and is persisted as part of a segment tree. More particularly, a shard is defined with a start offset, length, and simgroup ID. In an embodiment, it is persisted as part of the L1 segment. In this embodiment, a simgroup ID is per shard (instead of L1). That is, in this embodiment, simgroups are assigned to shards and not to L1 segments.

Thus, a shard (or CS shard) is a linear set of references belonging to a single similarity group. Data shards are written to a single distinct similarity group. As discussed, a similarity group is one of the many dedupe domains in the scale-out deduplication filesystem. Similarity groups acts as distinct deduplication domains. Similarity group ID is assigned to every data chunk of ingested data.

The span of a shard can be a fixed or variable size. A variable span can help address the loss of deduplication due to data shifts. In an embodiment, a shard anchoring algorithm decides the size within a range. In an embodiment, the span size may range from 8K to any larger size. The span size or range is configurable and can be tuned to balance competing demands for good deduplication, storage space for actual file or user data rather than overhead metadata of the filesystem, performance, and other competing demands.

Data shards facilitate virtual synthetics operations with similarity group-based architecture and data shifts in filesystem backups. As discussed, a data shard is a collection of fingerprints from a contiguous data chunk, all assigned, mapped to, or associated with the same simgroup ID. Instead of associating the simgroup ID with each L1 segment (which has a fixed span), the simgroup ID is associated with each data shard. This data sharding approach significantly enhances the deduplication ratio for filesystem backups and enables efficient support for virtual synthetics workloads in the scale-out deduplication filesystem.

In an embodiment, a data shard is a logical construct within the segment tree of the scale-out deduplication file system architecture. It is defined as a contiguous chunk of data that shares the same simgroup ID. Essentially, it is a collection of contiguous L0 data references (stored in the L1 segment) with the same simgroup ID. This approach allows for the assignment of a simgroup ID to a contiguous data chunk without size restrictions, and without affecting the overall span of the segment tree levels. Data shards provide greater flexibility and efficiency in managing data and its deduplication within the filesystem architecture.

In an embodiment, a data shard exists alongside the L1 segment in a segment tree. It is primarily stored as part of the L1 segment. A data shard is metadata information defined by the start offset and length of a contiguous data chunk within an L1 segment. The metadata information preserves the linear ordering, arrangement, or position of the L0 references with respect to each other in an L1 segment and across L1 segments. A data shard can span across L1 boundaries. In an embodiment, the data shard span size can range from 8K (average segment size) to any larger size. The data shard span size can be either fixed or variable. In the example shown in FIG. 12, a size of data shard Sh1 1220A is different from a size of data shard Sh4 1220D. The size of data shard Sh4 1220D is greater than the size of data shard Sh1 1220A. Data shard Sh4 1220D contains a greater number of references than data shard Sh1 1220A. The size of data shard Sh1 1220A is less than the size of data shard Sh4 1220D. Data shard Sh1 1220A contains a fewer number of references than data shard Sh4 1220D.

The data shard size can be determined based on deduplication and throughput performance. Using the data shard approach, a simgroup ID is assigned to each data shard, which determines how data is distributed across various similarity groups. The simgroup ID of each shard is stored in the L2 segment along with the L1 fingerprint.

Figure 13:
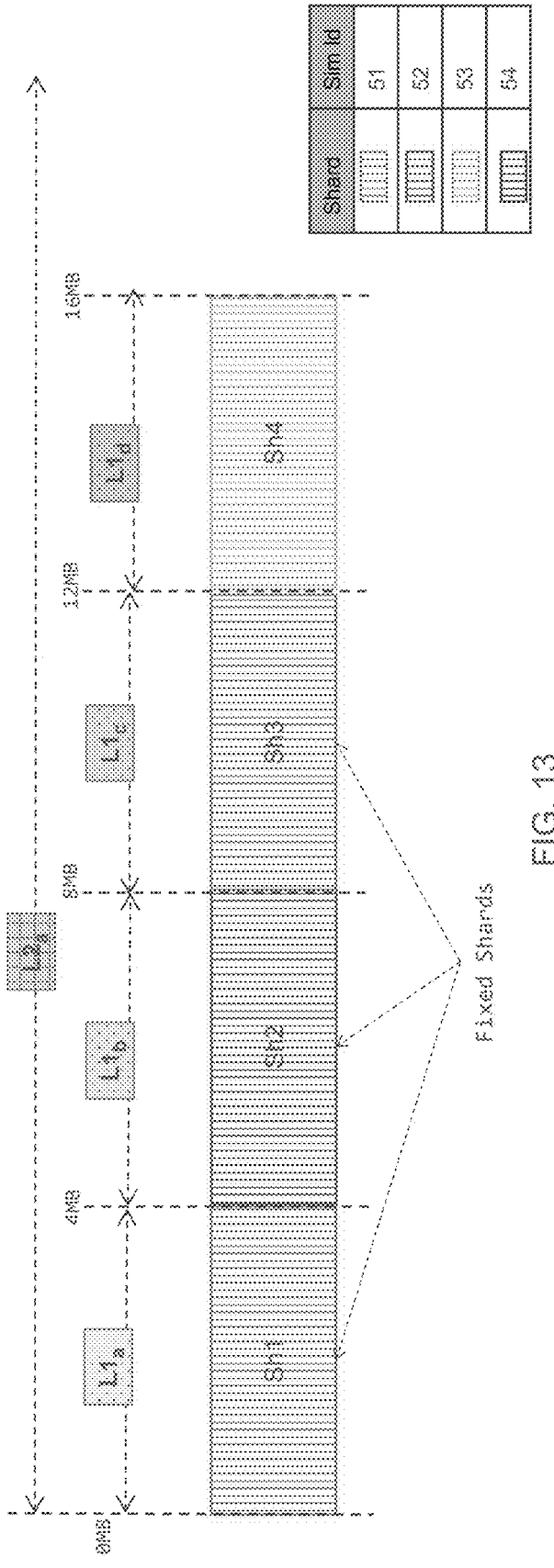
FIG. 13 shows an example of a fixed size shard that is 4 MB aligned, according to one or more embodiments.

FIG. 13 shows an example of fixed size shards having a size of 4 MB and that are aligned to the L1 segments. In embodiments having fixed size segmentation backups, the data shard span may be fixed at 4 MB, which matches the span of the L1 segment. In an embodiment, the data shard anchoring algorithm is identical to the L1 anchoring algorithm (i.e., 4 MB fixed). However, even with fixed size segmentation, the data shard approach allows for additional tuning of the data shard size. In other embodiments, different fixed span sizes other than 4 MB can be chosen. For example, in an embodiment, a fixed span size may be less than 4 MB. In another embodiment, a fixed span size may be greater than 4 MB.

FIG. 13 illustrates 16 MB of ingested data with four L1 segments $L1_a$-$L1_d$ and four data shards Sh1-Sh4. Each data shard aligns with the L1 segment in terms of offset and size, with one data shard per L1 segment. A table included with the figure shows the assignment of the data shards to similarity groups. For example, data shard Sh1 has been assigned to similarity group ID 51. Data shard Sh2 has been assigned to similarity group ID 52. Data shard Sh3 has been assigned to similarity group ID 53. Data shard Sh4 has been assigned to similarity group ID 54.

Figure 14:
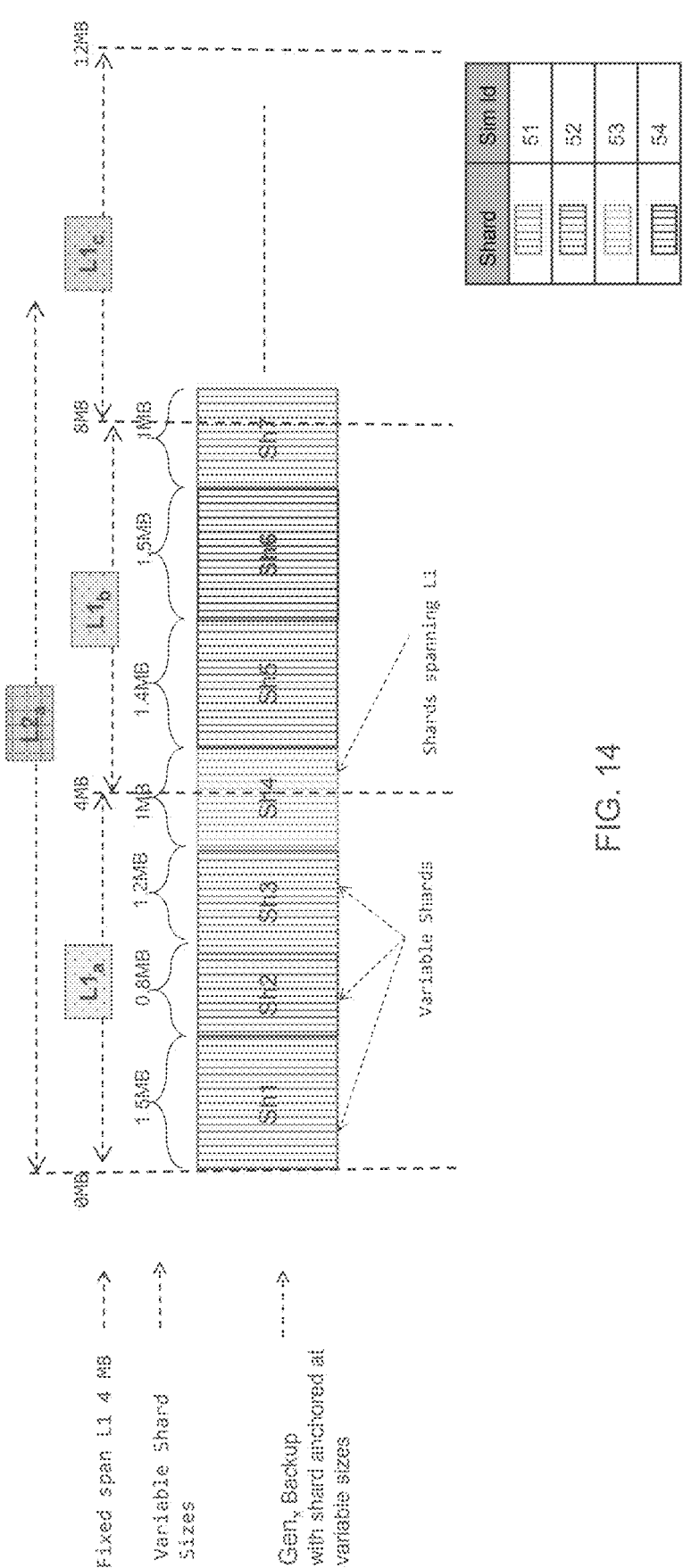
FIG. 14 shows an example of a variable size shard of 1 MB with a 0.5 MB to 1.5 MB range, according to one or more embodiments.

FIG. 14 shows an example of forming variable shards having an average size of 1 MB with a 0.5 MB to 1.5 MB size range. An $L2_a$ segment includes references to segments $L1_a$-$L1_c$. The L1 segments have a fixed span of 4 MB. Shards, e.g., Sh1-Sh7, have an anchored at variable sizes during a particular backup (e.g., $Gen_x$ backup). The shards may be formed and aligned independent of the alignment of the fixed span L1 segments and from which the L0 references are obtained.

For example, shard Sh1 has a size of 1.5 MB. Shard Sh2 has a size of 0.8 MB. Shard Sh3 has a size of 1.2 MB. Shard Sh4 has a size of 1 MB. Shard Sh5 has a size of 1.4 MB. Shard Sh5 has a size of 1.4 MB. Shard Sh6 has a size of 1.5 MB. Shard Sh7 has a size of 1 MB. Further, shards can span L1 segment boundaries. For example, shard Sh4 spans a 4 MB boundary between segment $L1_a$ and segment $L1_b$. A table included with the figure shows the assignment of the data shards to similarity groups.

For example, data shard Sh1 has been assigned to similarity group ID 51. Thus, all L0 data segments referenced by the L0 references specified in data shard Sh1 are assigned to similarity group ID 51 for deduplication.

Data shard Sh2 has been assigned to similarity group ID 52. Thus, all L0 data segments referenced by the L0 references specified in data shard Sh2 are assigned to similarity group ID 52 for deduplication.

Data shard Sh3 has been assigned to similarity group ID 51. Thus, all L0 data segments referenced by the L0 references specified in data shard Sh3 are assigned to similarity group ID 51 for deduplication.

Data shard Sh4, which spans an L1 boundary, has been assigned to similarity group ID 53. Thus, all L0 data segments referenced by the L0 references specified in data shard Sh4 are assigned to similarity group ID 53 for deduplication.

FIG. 14 shows 8 MB of ingested data with two L1 segments ($L1_a$ and $L1_b$) and seven CS shards (e.g., shards Sh1-Sh7). In an embodiment, CS shard size varies between 0.5 MB to 1.5 MB with an average size of 1 MB. In this embodiment, typically an L1 segment contains four CS shards and some of the CS shards can be partial CS shards. For example, segment $L1_a$ contains four shards Sh1-Sh4 within its boundaries, but last shard Sh4 is a partial shard because it spans an L1 boundary.

In embodiments having variable size segmentation, a data shard span is defined as a range with MAX_SHARD_SIZE, MIN_SHARD_SIZE, and AVG_SHARD_SIZE. In an embodiment, the data shard anchoring algorithm decides the size of the data shard within a specified range. Variable size data shard enables virtual synthetics in the scale-out deduplication filesystem by having the ability to anchor the data shard at the start and end offset of the include operation. It also addresses the loss of deduplication due to data shifts in variable-size backups.

In an embodiment, the data shard anchoring algorithm includes a window that moves across a set of contiguous L0 references held in L1-level segments, sequentially collects the L0 references into a data shard, anchors or closes the data shard when certain criteria is met, and opens a next data shard to repeat the process until all L0 references have been collected. In an embodiment, the criteria includes tracking a cumulative size or number of references collected into a data shard. Collection of L0 references into a shard may continue when a minimum threshold size for the shard has not yet been reached and end when a maximum threshold size for the shard has been reached or other condition is met.

Figure 15:
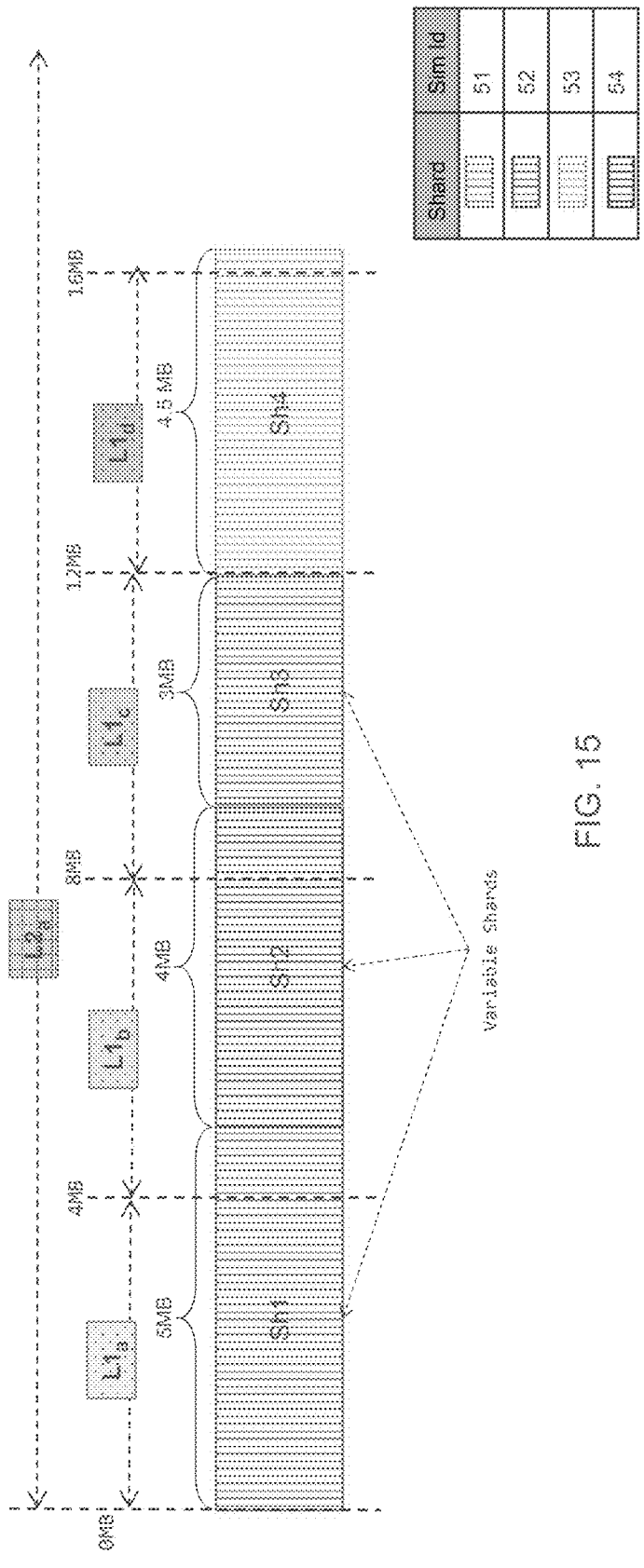
FIG. 15 shows an example of a variable size shard of 4 MB with a 2 MB to 6 MB range, according to one or more embodiments.

FIG. 15 shows an example of forming variable shards having an average size of 4 MB with a 2 MB to 6 MB range. FIG. 15 shows 16 MB of ingested data with four L1 segments ($L1_a$-$L1_d$) and four CS shards (shards Sh1-Sh4). In this embodiment, CS shard size varies between 2 MB to 6 MB with an average size of 4 MB. In this embodiment, typically an L1 segment contains either just one CS shard or two CS shards. One or both of the CS shards can be partial CS shards. Partial CS shards are the CS shards that span the L1 boundary.

For example, segment $L1_a$ contains a single shard Sh1 within its boundaries. Segment $L1_b$ contains portions of shards Sh1 and Sh2 within its boundaries. Segment $L1_c$ contains a portion of shard Sh2 and an entirety of shard Sh3 within its boundaries. Segment $L1_d$ contains shard Sh4 within its boundaries.

Figure 16:
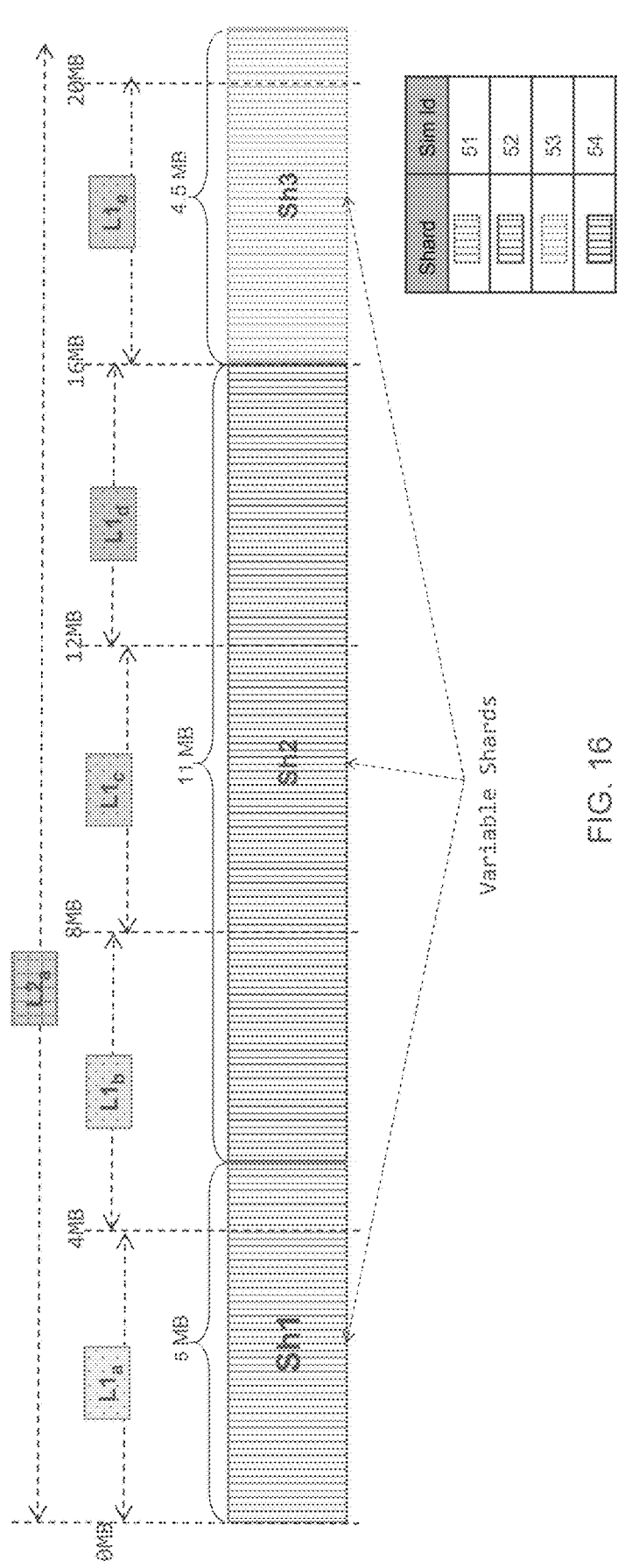
FIG. 16 shows an example of variable size shard of 8 MB with a 4 MB to 12 MB range, according to one or more embodiments.

FIG. 16 shows an example of forming variable shards having an average size of 8 MB with a 4 MB to 12 MB size range. FIG. 16 shows 20 MB of ingested data with five L1 segments (L1a-L1e) and three CS shards (shards Sh1-Sh3). In this embodiment, CS shard size varies between 4 MB to 12 MB with an average size of 8 MB. In this embodiment, typically the majority of an L1 segment contains one CS shard and a few with two CS shards.

Figure 17:
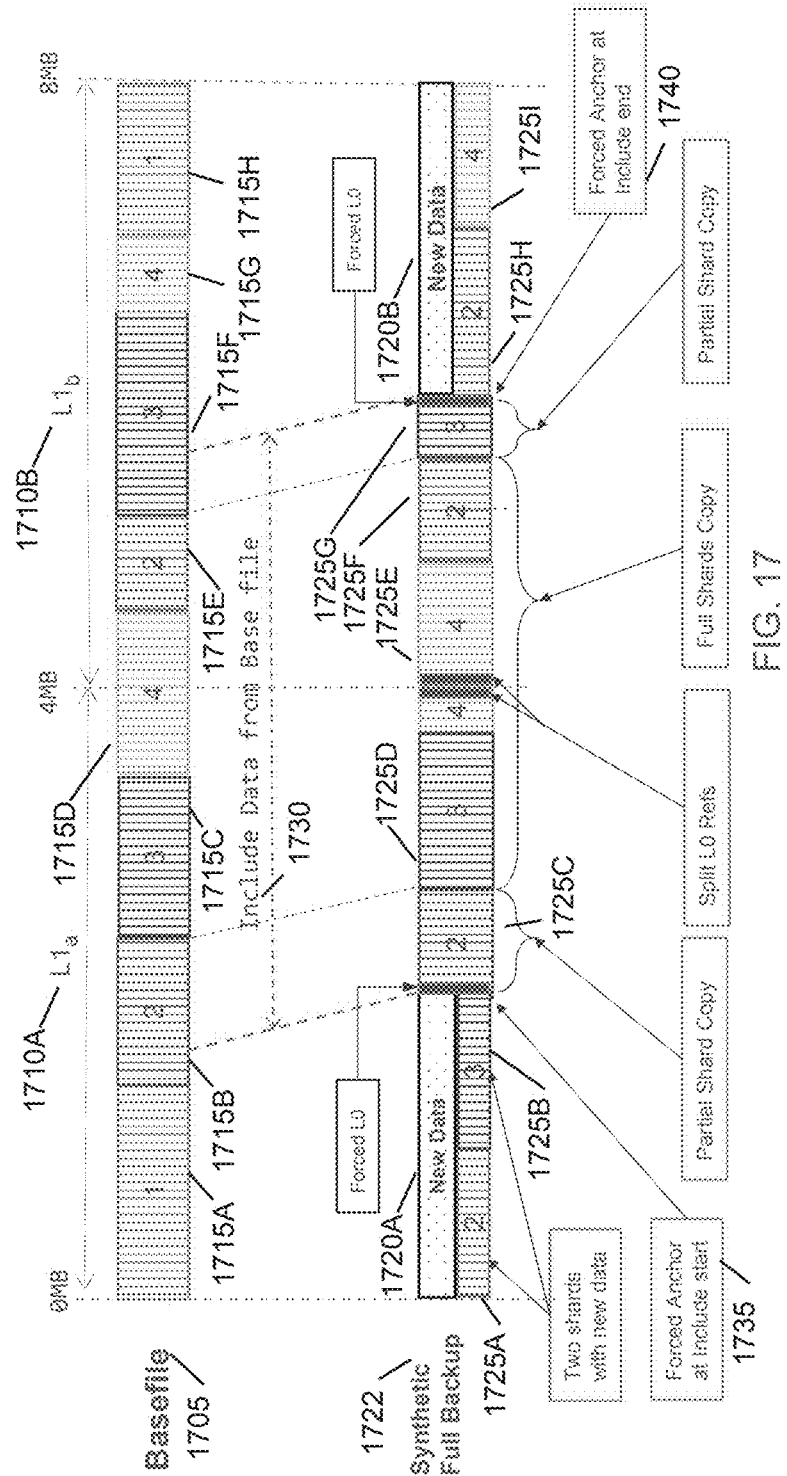
FIG. 17 shows an example of virtual synthetic operations with shards, according to one or more embodiments.

FIG. 17 shows an example of a virtual synthetic operation with data shards. As discussed, virtual synthetics (VS) is a technique of generating synthetic full backups by utilizing existing full backups and incremental backups. In optimized virtual synthetics, the backup application uses an "include" operation to specify that a contiguous portion of data from an existing backup should be included in the new backup. To efficiently implement the include operation, segment references are copied from the old files (base files) to the segment tree of the new file instead of reading and writing the actual data.

The VS include operation can start at any random offset and with any random length. In most cases, this does not align with the fixed L1 boundary of 4 MB. L0 segments from the base-file are likely to span the L1 boundary after the data shift (due to VS backups). Hence, split references are created at the L1 boundary to avoid the read/write of 8K segments that span the L1 boundary.

In a similarity group-based architecture, to support the include operation by simply copying refs and avoid data copying across simgroups, it is desirable to: 1) Derive the same simgroup id for the copied refs from the basefile; 2) Force anchoring of a data shard at the start and end of the include operation; 3) Have an ability to use the same shard boundaries as the basefile or create new shard boundaries;

and 4) Have an ability to ensure that split-references of an L0 segment belong to the same simgroup id.

Variable data shard allows for each of the above for virtual synthetic workflows. Further, forcing L0 anchoring at the start and end of the include operation, along with split references at the L1 boundary, is still maintained.

FIG. 17 illustrates how data shard improves the efficiency of the virtual synthetics "include" operation by eliminating the need for data copying in a similarity group-based architecture. Variable-sized data shard allows for: 1) Anchoring the data shard at the start and end offsets of the include operation; 2) Copying partial data shards from the base file to the destination file; 3) Copying full data shards from the base file to the destination file; and 4) Copying data shards from the base file to the destination file in such a way that both split references belong to the same shard if split references are present in the base file.

In other words, variable CS shards provides an ability to anchor shard at any offset, preserve the simgroup IDs of included data from the basefile, forced CS Shard anchoring at a start offset and end offset of the include operation, and to avoid small shards at the end, move the natural anchor to include small shards.

As shown in the example of FIG. 17, a basefile 1705 has been backed up to the deduplication filesystem in a previous full backup. As part of the ingestion process, segments $L1_a$ and $L1_b$ 1710A,B, respectively, are created and aligned at 4 MB boundaries. A first set of shards 1715A-H is formed by collecting a linear set of contiguous L0 references from corresponding L1 segments and anchoring according to an anchoring algorithm. These L0 references are shown using a pattern of vertical lines in FIG. 17. As discussed, the shards have a variable size and can be anchored independently of the L1 segments. It is not necessary for a variable size shard to be aligned with the L1 segments. A shard may be contained within or bounded by an L1 segment or may span across a boundary of the L1 segment. An L1 segment may contain multiple, e.g., two or more shards within its boundaries where each of the two or more shards are assigned to different (or the same) similarity groups.

Each shard is assigned to a similarity group based on one or more references collected into a respective shard. For example, shard 1715A has been assigned to a first similarity group. Shard 1715B has been assigned to a second similarity group. Shard 1715C has been assigned to a third similarity group. Shard 1715D has been assigned to a fourth similarity group. Shard 1715E has been assigned to the second similarity group. Shard 1715F has been assigned to the third similarity group. Shard 1715G has been assigned to the fourth similarity group. Shard 1715H has been assigned to the first similarity group.

A subsequent backup after the previous full backup is an incremental backup that includes first and second new data 1720A,B. A synthetic full backup of the file 1722 is created by writing the new data, but synthesizing existing data based on the base file.

Specifically, a new or second set of shards 1725A-I is formed for the synthetic full backup. The new or second set of shards contain references for the new data written (along with new assignments to similarity groups) and references "included" or copied from the first set of shards. The second set of shards containing the copied references from the first set of shards retain, inherit, derive, preserve, or are assigned the similarity group assignments of the first set of shards.

For example, each of the first and second new data has a starting offset and length (or locations) at which the data should be written. The first and second new data is written at the specified locations in the synthetic full backup. The first new data has a starting offset at 0 MB and an ending offset before a 4 MB boundary of segment $L1_a$. The ending offset is marked with a forced anchoring of a new shard for the new data.

Specifically, new shards 1725A,B are formed for new data 1720A and corresponding new assignments are made to similarity groups based on one or more references contained in respective new shards 1725A,B. Specifically, new shard 1725A has been assigned to the second similarity group. New shard 1725B has been assigned to the third similarity group.

An include operation 1730 specifies the starting and ending offset from the base file for which references are to be copied into the synthetic full backup. Specifically, there is a forced anchor 1735 at a start of the include operation. The forced anchor marks a closing of new shard 1725B to accept L0 references and an opening of new shard 1725C to begin receiving L0 references.

New shard 1725C is a partial shard copy as only a subset of L0 references from previous corresponding shard 1715B of the first set of shards is copied to new shard 1725C due to new data 1720A. New shard 1725C retains the similarity group assignment (simgroup ID 2) of previous shard 1715B. Variable size shards thus allow copying a subset of references from a previous shard into a new shard and allowing the new shard to retain the similarity group assignment of the previous shard.

New shards 1725D-F are full shard copies as all of the L0 references from previous corresponding shards 1715C-E are copied into the new shards. New shards 1725D-F retain the similarity group assignments of their corresponding previous shards. For example, new shard 1725D retains the similarity group assignment (simgroup ID 3) assigned to previous shard 1715C. New shard 1725E retains the similarity group assignment (simgroup ID 4) assigned to previous shard 1715D. New shard 1725F retains the similarity group assignment (simgroup ID 2) assigned to previous shard 1715E.

There is a split in L0 references at the 4 MB boundary when forming the synthetic full backup. Variable sized shards, however, are allowed to span across L1 boundaries. Thus, new shard 1725E includes an L0 reference immediately to a left of the 4 MB boundary and another L0 reference immediately to a right of the 4 MB boundary. In another embodiment, a shard spanning an L1 boundary may be split into two separate shards, but each separate shard may have the same similarity group assignment.

There is a forced anchor 1740 at an end of the include operation. The forced anchor marks a closing of new shard 1725G to accept L0 references and an opening of new shard 1725H to begin receiving L0 references. New shard 1725G is a partial shard copy as only a subset of L0 references from previous corresponding shard 1715F of the first set of shards is copied to new shard 1725G. New shard 1725G retains the similarity group assignment (simgroup ID 3) of previous shard 1715F.

The second new data has a starting offset between a 4 MB and 8 MB boundary of segment $L1_b$ and ending offset at the 8 MB boundary. New shards 1725H,F are formed for new data 1720B and corresponding new assignments are made to similarity groups based on one or more references contained in respective new shards 1725H,F. Specifically, new shard 1725H has been assigned to the second similarity group. New shard 1725I has been assigned to the fourth similarity group.

Figure 18:
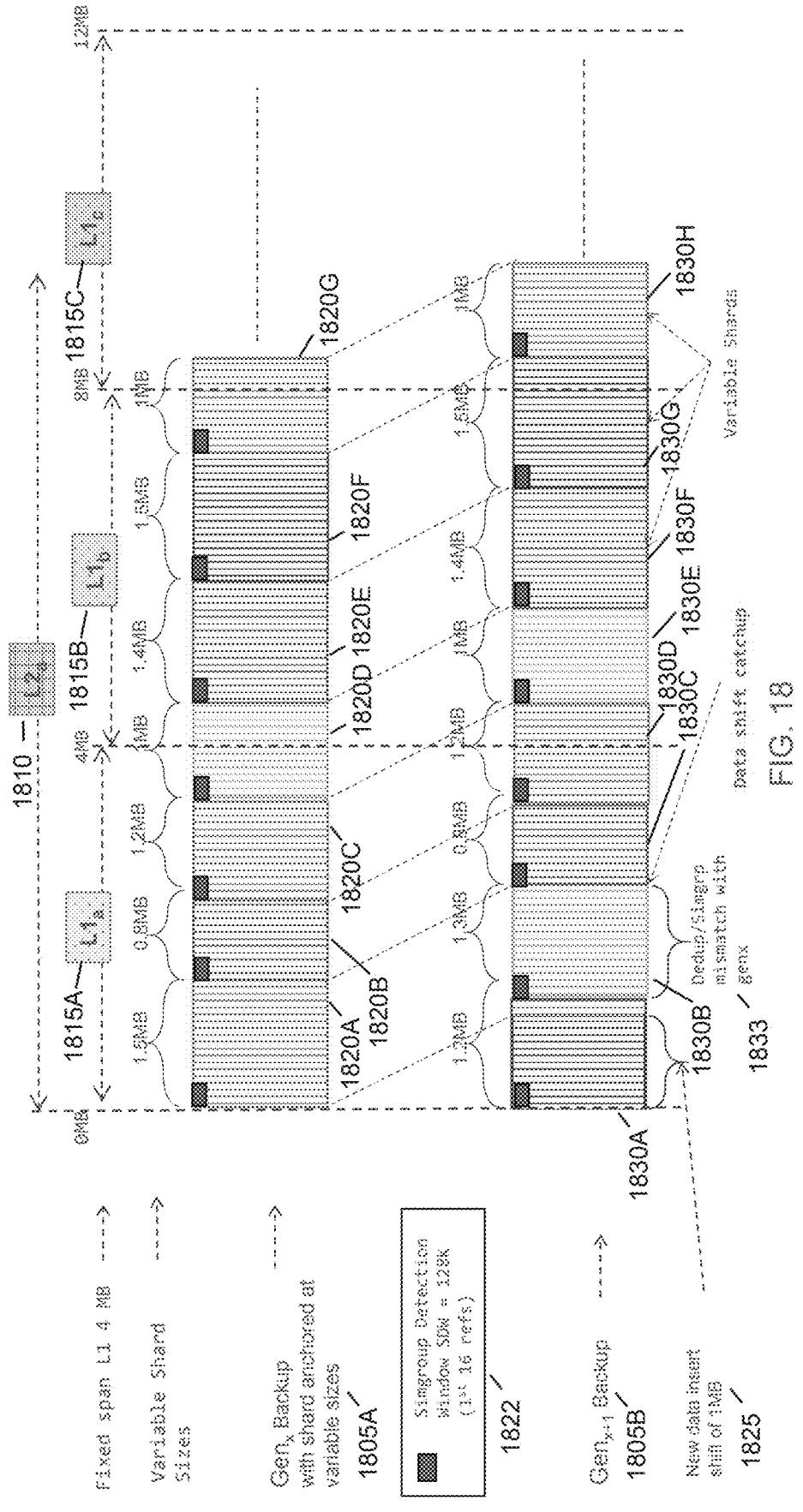
FIG. 18 shows an example of a variable shard with data shift, according to one or more embodiments.

FIG. 18 shows an example of variable shards handling data shifts in a subsequent backup. Variable data shards can help reduce deduplication issues in filesystem backups when data shifts occur between successive backup generations. This is accomplished through a variable data shard anchoring algorithm, which typically reconciles data shifts with the previous backup generation (depending on the data change rate). Several algorithms can be used to anchor the shards such as: 1) Maximum of rolling XOR checksum (similar to existing L0 segment anchoring); 2) Using the Minhash value of the reference; 3) Using the MaxHash value of the reference; and 4) Pattern matching. Pattern matching may include closing a shard upon detecting that a last collected reference or fingerprint added to the shard (or a pending reference or fingerprint to be added) matches a specific pattern (or upon a size of the shard reaching a threshold maximum size). Variable size shards facilitate catching up to data shifts, thus reducing the deduplication losses.

FIG. 18 illustrates two successive generations of backups: the first as Gen(x) and the second as Gen(x+1). In the second backup, 1 MB of new data is inserted at the start of the file, while the rest remains unchanged from the first backup. This new data insertion in the second backup causes a data shift compared to the first backup. Both backups use variable data shards created with an anchoring algorithm. Due to the new data, the data shards spanning this new data are assigned new simgroup IDs. After one or two shards, the remaining shards align with the base file and retain or are assigned the same simgroup ID, thereby achieving a better deduplication ratio.

More specifically, a first generation (gen$_x$) backup 1805A includes a file segmented into a number of segments including an L2$_a$ segment 1810. The L2$_a$ segment includes references to L1 segments L1$_a$ 1815A, L1$_b$ 1815B, and L1$_c$ 1815C. The L1 segments have a fixed span of 4 MB. A first set of variable sized shards 1820A-G may be formed using a shard anchoring algorithm that collects contiguous L0 references from the L1 segments into a shard, anchors the shard according to criteria, opens a next shard, immediately adjacent to the anchored shard, and continues the collection of contiguous L0 references. A pattern of vertical lines in the figure illustrates the L0 references collected into the shards. Shard anchoring may be performed in conjunction with a simgroup detection window 1822 that examines at least a subset of L0 references in a shard to determine a similarity group to which the shard should be assigned. In an embodiment, the simgroup detection window examines the first 16 references in a shard to determine similarity group assignment. For example, in an embodiment where each reference has a size of 8K, the first 128K amount of data in a shard is examined (e.g., 16×8K=128K).

In the example shown in FIG. 18, shard 1820A is assigned to a first similarity group. Shard 1820B is assigned to a second similarity group. Shard 1820C is assigned to the first similarity group. Shard 1820D is assigned to a fourth similarity group. Shard 1820E is assigned to the second similarity group. Shard 1820F is assigned to a third similarity group. Shard 1820G is assigned to the first similarity group.

A subsequent or second generation (gen$_{x+1}$) backup 1805B includes an insertion 1825 of 1 MB of new data at a beginning of the file. A new or second set of variable sized shards 1830A-H is formed for the updated file. New shard 1830A is formed and receives a similarity group assignment to the third similarity group. Although the remaining existing data is unchanged since the previous backup, the shift to the right of the remaining data causes a dedup/simgroup mismatch 1833 with the previous or first generation backup. Specifically, the shift causes a new similarity group assignment to immediately adjacent new shard 1830B due to the different references mapping to a different portion of the corresponding shard. That is, rather than retaining an assignment to the first similarity group, new shard 1830B has a new assignment to a different similarity group, e.g., the fourth similarity group.

However, because shards can be anchored at variable sizes, as the simgroup detection window continues to traverse, move across, or receive an input stream of the L0 references in its examination, the remaining shards eventually align with the base file and thus retain or are assigned the same simgroup ID. For example, new shard 1830C, corresponding to previous shard 1820B, has retained the same similarity group assignment as previous shard 1820B, e.g., second similarity group. New shard 1830D, corresponding to previous shard 1820C, has retained the same similarity group assignment as previous shard 1820C, e.g., first similarity group. New shard 1830E, corresponding to previous shard 1820D, has retained the same similarity group assignment as previous shard 1820D, e.g., fourth similarity group. New shard 1830F, corresponding to previous shard 1820E, has retained the same similarity group assignment as previous shard 1820E, e.g., fourth similarity group. New shard 1830G, corresponding to previous shard 1820F, has retained the same similarity group assignment as previous shard 1820F, e.g., third similarity group. New shard 1830H, corresponding to previous shard 1820G, has retained the same similarity group assignment as previous shard 1820G, e.g., first similarity group.

The number of cycles to catchup to a data shift can vary depending upon factors such as the data change rate and change distribution (e.g., location of the change). For example, a change only at a start may require one or two cycles. While higher change rates and distributions can lead to a greater number of cycles and mismatches, in a production environment it is unlikely that each successive incremental backup will contain large and numerous changes scattered throughout the file.

FIG. 19 shows a flow for using data shards when generating a virtual synthetic full backup of a file. In a step 1910, files in a deduplication filesystem are represented by segment trees. The segment trees include multiple segment levels arranged in a hierarchy. The files include a file segmented into upper-level segments. The upper-level segments include contiguous references to segments of the file that form a lowest-level of a segment tree for the file. The upper-level segments are aligned at fixed-size boundaries in the file.

In a step 1915, a first set of shards are formed for the file. Each shard is aligned in the file independent of an alignment in the file of the upper-level segments. Each shard includes at least a subset of contiguous references from an upper-level segment.

In a step 1920, the shards are assigned to similarity groups within which deduplication is performed.

In a step 1925, incremental changes to the file are received. The incremental changes may be received during a subsequent incremental backup of the file.

In a step 1930, a virtual synthetic full backup of the file is generated based on the previous full backup of the file and the incremental changes. Specifically, in a step 1935, new data of the incremental changes is segmented into new upper-level segments. The new upper-level segments are aligned at fixed-size boundaries in the synthetic full backup and include new contiguous references to new segments of the new data.

In a step 1940, a second set of shards are formed for the virtual synthetic full backup. The shards of the second set of shards include shards that include the new contiguous references from the new upper-level segments and which have new assignments to the similarity group. The shards of the second set of shards further include other shards that include copies of at least subsets of contiguous references from shards of the first set of shards and that retain assignments to the similarity groups of the first set of shards.

In various embodiments, systems and techniques provide forming content-based variable-sized data chunks/shards from incoming data to enable high deduplication for file-system backups, in a scale-out deduplication filesystem; enabling efficient virtual synthetics workload support using variable-sized chunks, in scale-out deduplication filesystem; forming a fixed size data shard in a segment tree without impacting the span of any segments; forming a variable size data shard in a segment tree without impacting the span of any LP segments; forming a data shard in a segment tree at any offset and with any length, irrespective of L1 segment boundaries; forcefully anchoring the data shard at the start offset of the virtual synthetic include operation; forcefully anchoring the data shard at the end offset of the virtual synthetic include operation; and allowing both fixed size data shard and variable size data shard being represented in a segment tree.

As discussed, the span of a CS shard can be either fixed or variable in size. It is a collection of contiguous L0 references (stored in an L1 segment) with the same similarity group ID. In an embodiment, there is a theoretical maximum limit to the number of CS shards that can exist within a single L1 segment that is enforced by the file system. In an embodiments, systems and techniques are provided to address situations where the number of CS shards go beyond this maximum limit.

Figure 20:
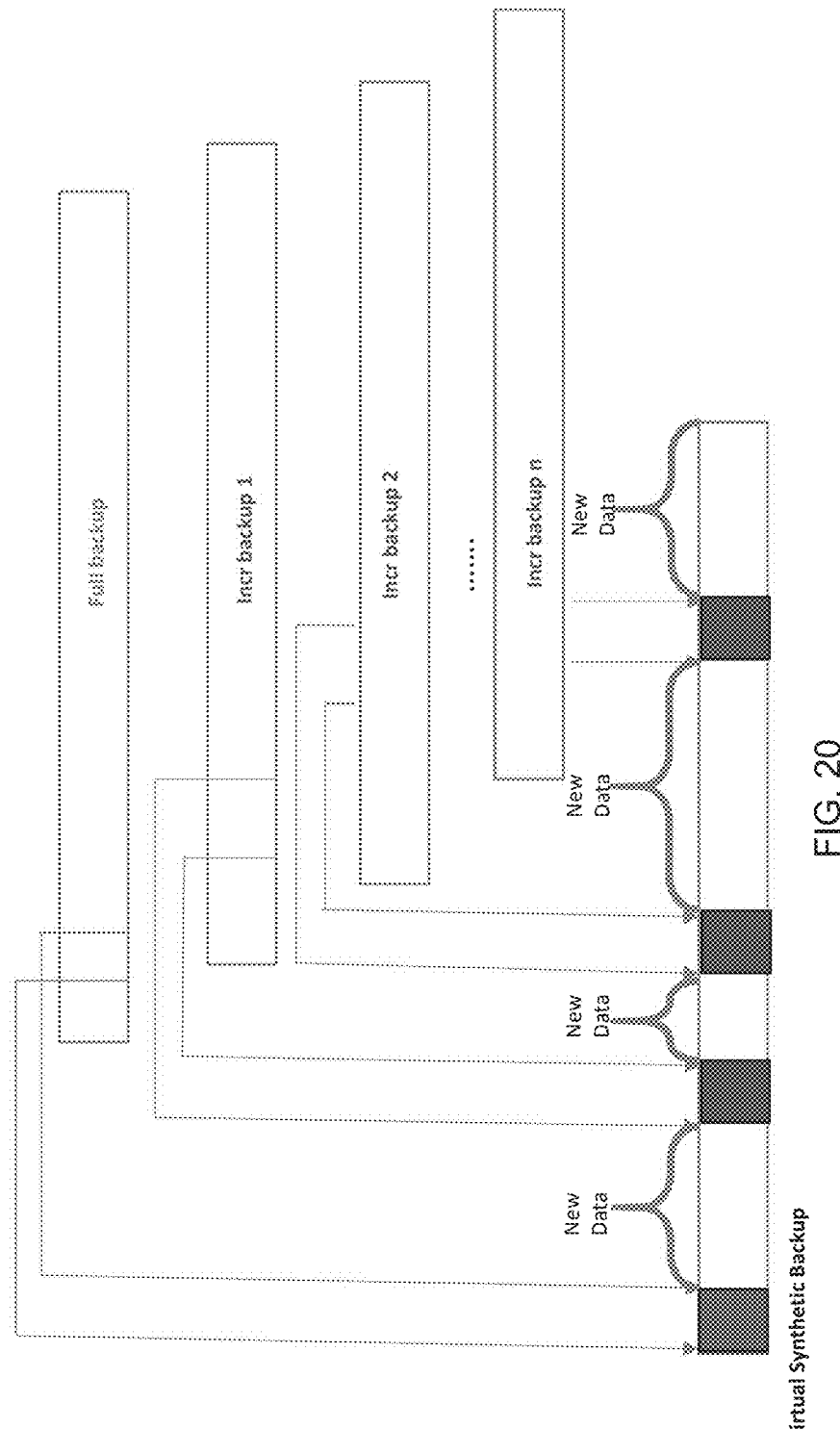
FIG. 20 shows a block diagram of a full backup followed by incremental backups, according to one or more embodiments.

Modern applications tend to make use of synthetic backup and restores for lower recovery point objective (RPO) and recovery time objective (RTO) goals without lowering on standards. It is commonly observed that on a higher gen-eration backups, the size of "include" operations are rela-tively smaller as compared to lower generation backups. Each such include is likely to create a distinct CS shard as the "include" operation would inherit the similarity group information from the base files. A virtual full backup could be created out of segment references from multiple base files. FIG. 20 shows a block diagram of a full backup, followed by several incremental backups, and a virtual synthetic backup that may be created from the full backup and incremental backups.

With higher generation synthetic backups-CS shard fanouts may be a common and a frequent scenario which would incur data movement, leading to performance over-heads and deduplication efficiency implications. There is a continuing need to provide shorter backup times with syn-thetic backups.

In an embodiment, systems and techniques provide for reducing or minimizing the overall impact on performance by reducing the amount of data movement, whenever a CS shard fanout event occurs with synthetic backups. A fanout even occurs when a number of shards contained or bounded within a single L1 segments exceeds a threshold count. In this embodiment, a multi-phased approach reduces or mini-mizes the amount of data that needs to be moved across similarity groups when CS shard fanout events occur with synthetic backups. A first phase includes identifying the target number of CS Shards to be merged. A second phase includes identifying the potential CS shards that could be merged. A third phase includes movement of data across source and target similarity groups. A fourth phase includes merging the CS shards.

As discussed, in an embodiment, a scale-out deduplica-tion file system includes a similarity group aware architec-ture, and each similarity group acts as a distinct dedupe domain in the system. The on-disk layout of the backup files is enhanced to include the CS shard information at the tail end of the L1 segment. In an embodiment, the maximum number of CS shards in each L1 segment is configured at a maximum 32.

On higher generation backups, it is likely to get small includes which might belong from distinct similarity groups. Each such include would lead to the creation of a unique CS shard. This leads to an exceedingly high probability of getting into a situation where the number of CS shards goes beyond the supported limits enforced by the file system. In other words, over the course of generating synthetic backups for a file, there can be increasingly large numbers of shards formed for each L1 segment as the filesystem continues to satisfy requests for include operations. Each include opera-tion over successive synthetic backup generations may include a smaller and smaller number of references from the base files leading to very small, but very many shards. That is, the number of references in a shard reduces, but the number of shards increases. Each subsequent synthetic backup generation may include changes with data being overwritten, data being added, and so forth. Maintaining such large numbers of shards can consume overhead storage space that could otherwise be used to store other data such as user data or other metadata to support other services. When a number of shards exceeds a threshold limit, this event may be referred to as a fanout.

It is desirable to reduce the number of shards to within supported limits. A challenge is to overcome data movement across dedupe domains. Unlike single node deduplication file, where there was a single dedupe domain, this would not really have been an issue. In a scale-out deduplication filesystem, however, changing the similarity group for a segment reference would implicitly mean movement of the segment data itself. This imposes major performance over-heads. This also takes away the core benefit of synthetic backups, i.e., performance.

Additionally, synthetic backups may also exhibit bad locality leading to poor restore performance. Having to manually repair locality on such backup files such that restore performance becomes optimal is not desirable. In an embodiment, systems and techniques help improve or opti-mize the overall process of locality repair with optimal or good data movement.

Figure 21:
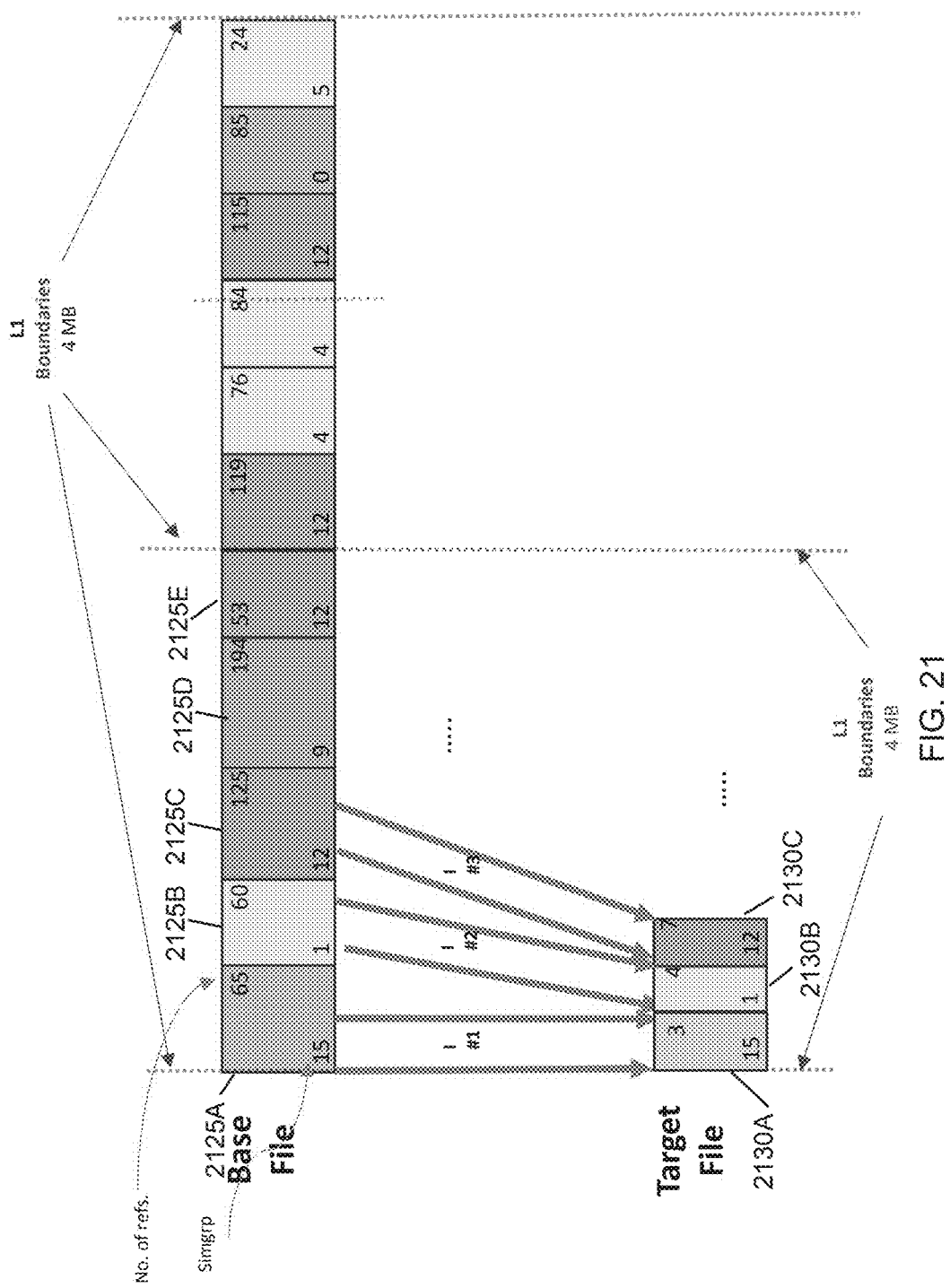
FIG. 21 shows an example of small include operations, according to one or more embodiments.

FIG. 21 shows an example of how a small include operation leads to a shard. The example shown in FIG. 21 includes a basefile segmented into a two L1 segments each spanning 4 MB. A set of shards 2125A-E are contained or bounded the first L1 segment. Shard 2125A has 65 refer-ences and is assigned to simgrp ID 15. Shard 2125B has 60 references and is assigned to simgrp ID 1. Shard 2125C has 125 references and is assigned to simgrp ID 12. And so forth. A target file is created as part of a synthetic backup. New shards 2130A-C are created first, second, and third include operations, respectively. The first include operation has copied three references from shard 2125A to new shard 2130A. New shard 2130A retains the simgrp assignment of 15 assigned to previous shard 2125A. The second include operation has copied four references from shard 2125B to new shard 2130B. New shard 2130B retains the simgrp assignment of 1 assigned to previous shard 2125B. The third include operation has copied seven references from shard 2125C to new shard 2130C. New shard 2130C retains the simgrp assignment of 12 assigned to previous shard 2125C. And so forth.

Figure 22:
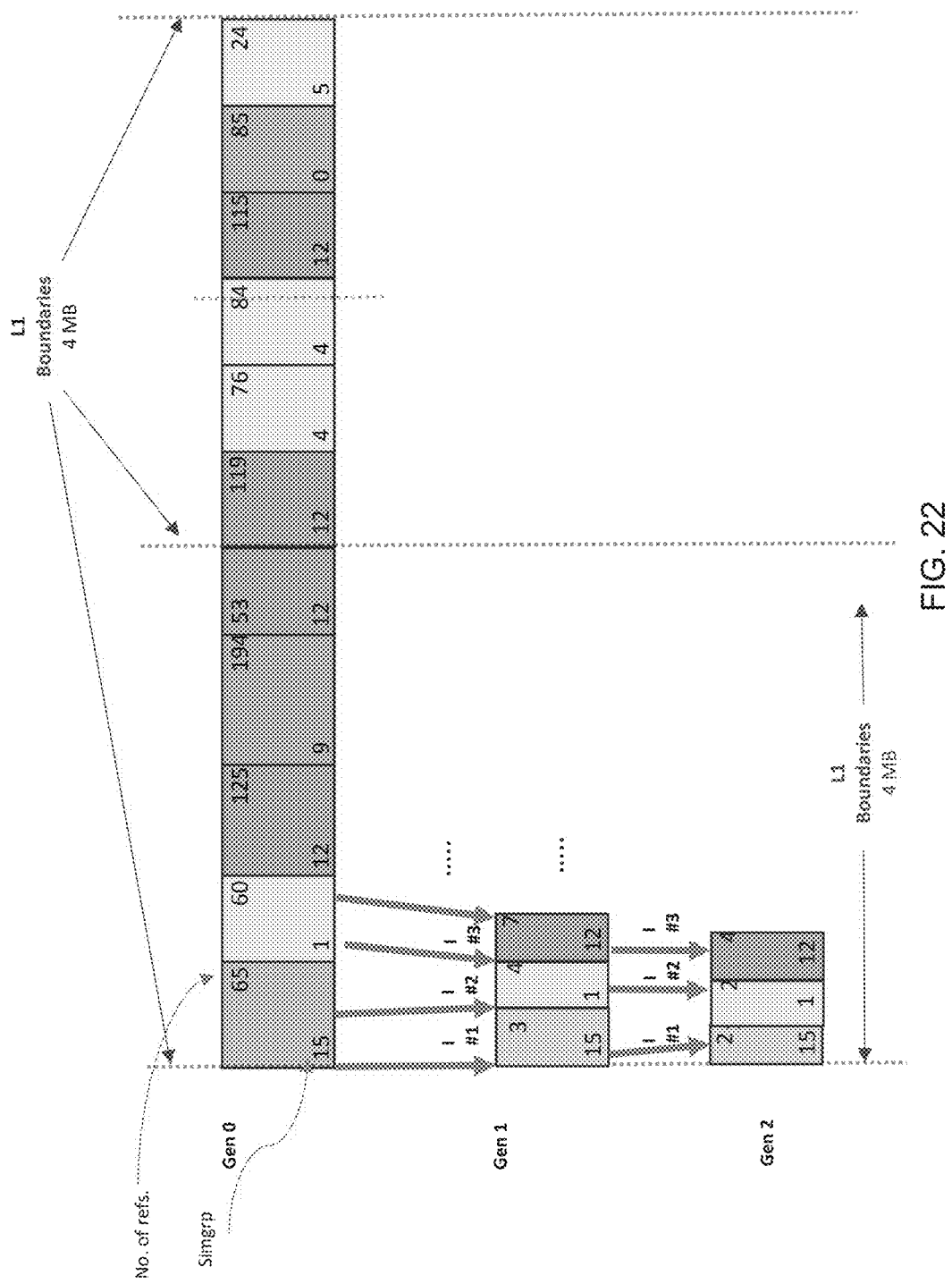
FIG. 22 shows an example of small include operations in higher generation backups, according to one or more embodiments.

FIG. 22 shows an example progressively higher generation backups leading to ever smaller shards. FIG. 22 is similar to FIG. 21, but shows the effect of another backup generation regarding the ever smaller number of references included with the corresponding shards.

Figure 23:
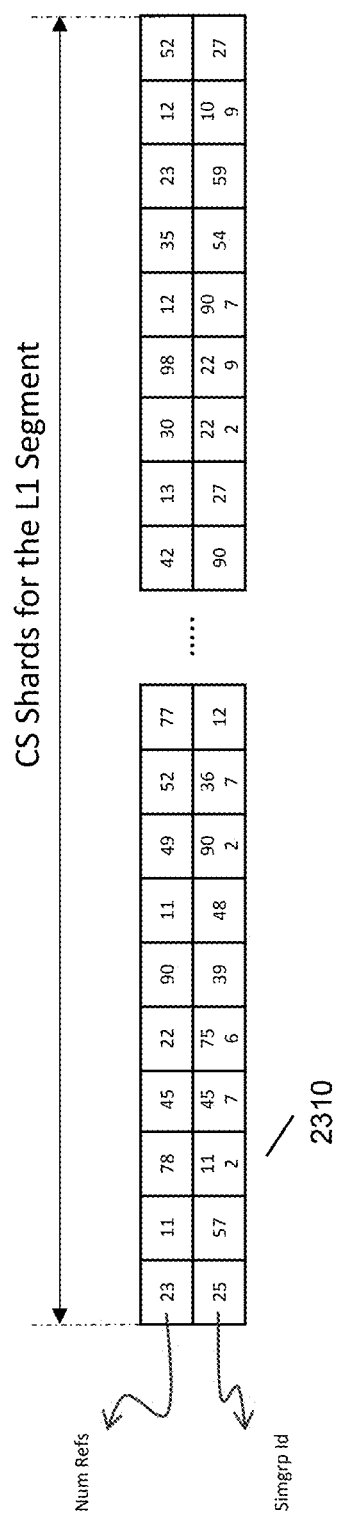
FIG. 23 shows a data shard fanout event, according to one or more embodiments.

FIG. 23 shows a data shard fanout event. There are a set of shards 2310 for an L1 segment. A first shard includes 23 references and is assigned to simgrp ID 25. A second shard includes 11 references and is assigned to simgrp ID 57. A third shard includes 78 references and is assigned to simgrp ID 112. And so forth. In this example, the number of shards has exceeded a threshold count, e.g., 32, for the number of shards per L1 segment. This is a filesystem on-disk limit. The likelihood of shard fanouts increase as the number of small include operations, overwrites, higher generation backups, and number of similarity groups increase.

In an embodiment, the CS shard fanout problem is overcome by simply reading the segment data of all the CS shards belonging to the L1 segment and performing a re-sharding (shard anchoring the references) on the L0 segment references. This helps to ensure a re-organization of the L0 segment references in the L1 segment so that the number of CS shards is within the supported maximum limits.

Figure 24:
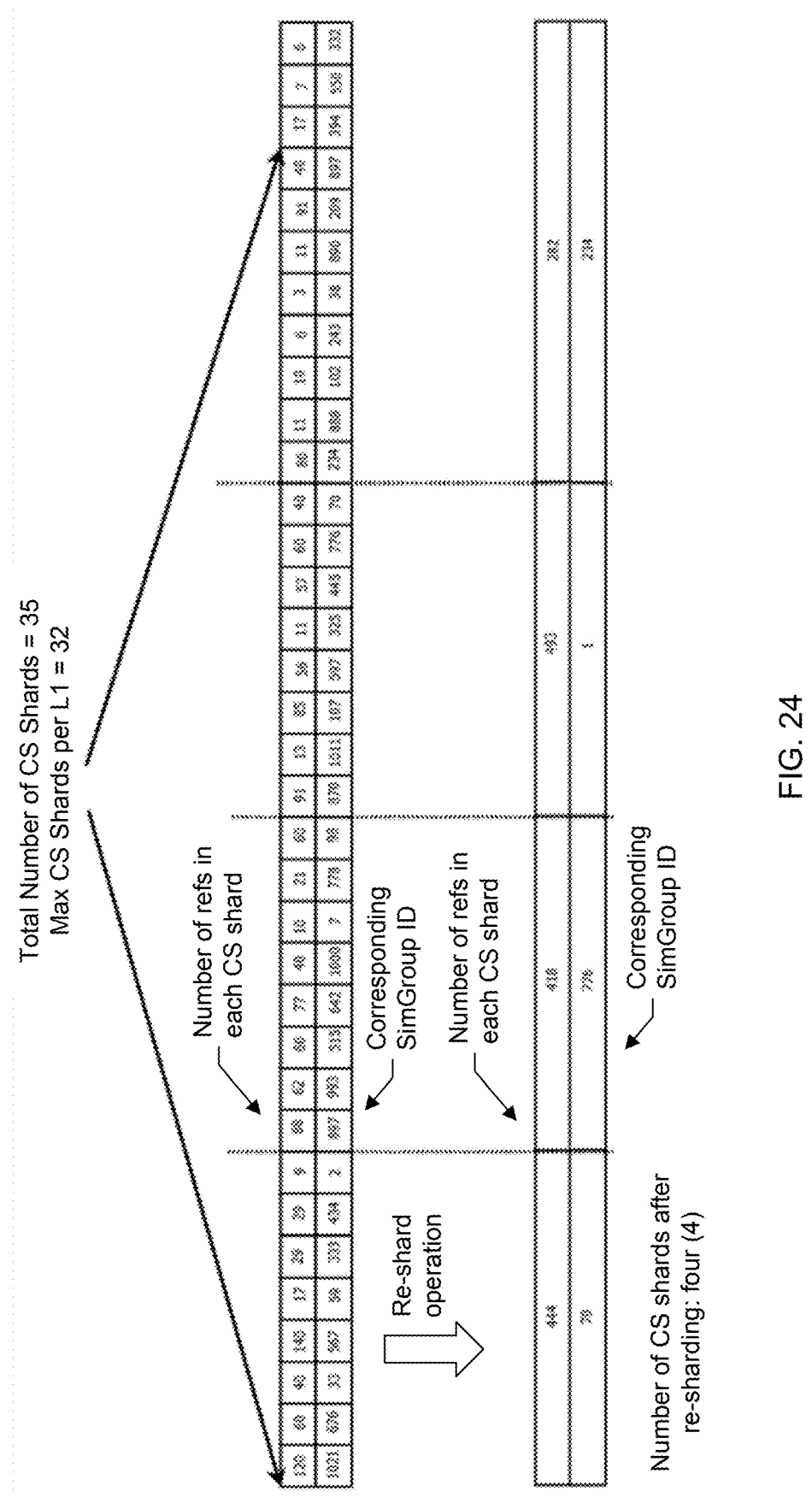
FIG. 24 shows an example of resharding during a data shard fanout event, according to one or more embodiments.

But this approach incurs the overhead of moving a much larger (the complete L1 segment data in most cases) amount of data after re-anchoring of the CS shards for the references in L1 segment. FIG. 24 illustrates a situation where the file system has run into a CS shard fanout situation and a CS re-sharding is done to overcome the situation. It could be seen that all the segment data had to be moved from the existing similarity groups to the newly identified similarity groups as part of the re-sharding process. This approach fixes the fanout issues but introduces two fundamental issues-data copy leading to non-optimal performance and loss of dedupe efficiency.

It is desirable to further optimize the above method. In an embodiment, reducing the number of CS shards is accomplished by merging them to bring the count below the permissible limits. Such merging, however, implicitly leads to movement of data. It is desirable, therefore, to reduce or minimize this data movement such that the overall performance implications are low or minimalistic and preserve the deduplication efficiency to the extent possible.

In an embodiment, systems and techniques are provided to optimally identify and merge potential CS shards that would have minimal or little impact to the overall backup performance in cases where a CS shard fanout occurs.

In an embodiment, an algorithm to handle a CS shard fanout occurrence or event includes four phases. A first phase includes establishing the number of CS shards to merge. A second phase includes identifying potential CS shards for merging. A third phase includes movement of data across similarity groups. A fourth phase includes merging the CS shards.

The following is a discussion of each of four phases in detail.

First Phase: Number of CS Shards to Merge

In an embodiment, the number of CS shards that need to reduce is set to a given constant, e.g., 75 percent (%) of the maximum supported CS shard limit in an L1 segment. This can be varied through system configuration parameters. For example, it may be desirable to reduce the CS shard count from 35 to 24 (75 percent of the maximum limit of 32).

Second Phase: Identifying Potential CS Shards for Merging

Now that the number of CS shards needed to reduce to is determined, a next step includes identifying the potential candidates for merging while ensuring that it leads to a minimal amount of data movement across similarity groups. The least amount of data movement occurs when moving the CS shards with the least amount or fewest number of segment references in it. This can be achieved through multiple approaches. Two example techniques are listed below.

A first technique may be referred to as K least element using min-heap. To identify K such potential CS shards, a step includes identifying the CS shards with the least or fewest number of segment references. This can be achieved by creating a min-heap of size K and extracting K elements from a min-heap. Heap construction takes O(N). Each extraction takes O(log K) and hence to extract K such elements, this overall operation can be achieved in O(K log K). Overall, the selection process can be completed in time O(N)+O(K log K).

A second technique may be referred to as sliding window. A window in this approach is defined as a linear sequence of consecutive CS shards. If a window of "K" consecutive shards is chosen, the merging process can reduce the shard count by K−1, thus leaving behind one shard.

Consider, as an example, that the shard count needs to be reduced by four. This can be achieved in multiple ways including:
1) Identify a single window of five CS shards. Merging would reduce to one shard, thus achieving the target of reducing shard count by four.
2) Identify a window of four CS shards and another window with two CS shards. Merging the first window would reduce shard count by three, and merging the second window would reduce the shard count by one. Total reduction in shard count is four, which is the desired reduction.
3) Identify two windows of three CS shards. Merging each of the windows would reduce the shard count by two each, achieving a total reduction of four.
4) Identify four windows of two CS shards. Merging each of the windows would reduce the shard count by one each, achieving a total reduction of four.

The number of options for shard sequence selection can be all combinations yielding to the required number, i.e., four in this case.
   4=4 (pick one shard window with five shards)
   4=3+1 (pick two shard windows, with four and two shards respectively)
   4=2+2 (pick two shard windows, each with three shards)
   4=1+1+1+1 (pick four shard windows, each with two shards)

Figure 25:
FIG. 25 shows a window of size two, according to one or more embodiments.
Figure 26:
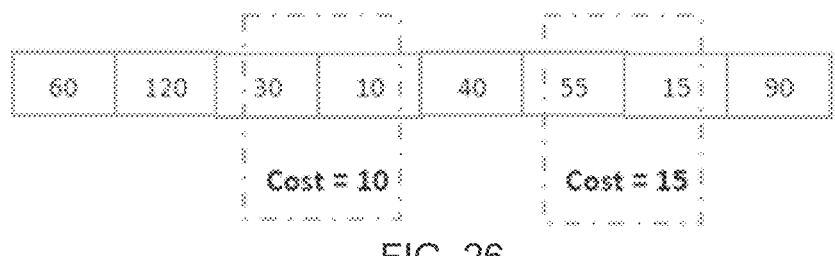
FIG. 26 shows sample windows of size two, according to one or more embodiments.
Figure 27:
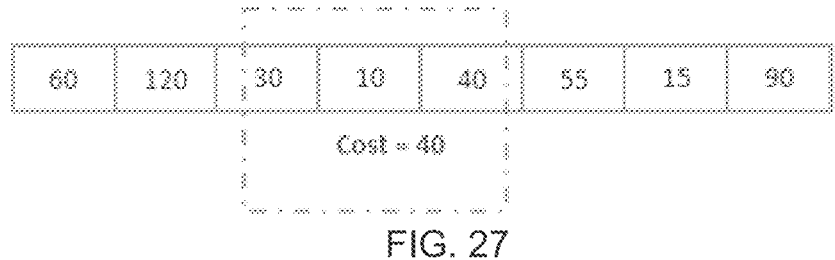
FIG. 27 shows a sample window of size three, according to one or more embodiments.
Figure 28:
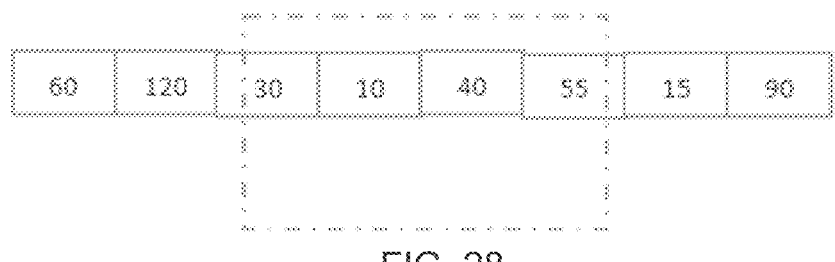
FIG. 28 shows a sample window of size four, according to one or more embodiments.

The cost associated with windows of assorted sizes in the sliding window approach is illustrated in FIGS. 25-28. FIG. 25 shows a window of size two. FIG. 26 shows sample windows of size two. FIG. 27 shows a sample window of size three. FIG. 28 shows a sample window of size four.

By running a window of selected size over the array, a "cost" of each shard window may be calculated. Cost here is not the summation over all CS shards in the selected window. In an embodiment, a similarity group of one of the CS shards in the window is selected as the target similarity group and hence the cost is a summation of the number of references in the non-target CS shards. Once the CS shard sequence costs are known for a shard size "s", shard sequences in increasing order of cost may be picked to achieve the desired reduction.

Third Phase: Data Movement Across Similarity Groups

In an embodiment, data movement across similarity groups includes reading the segments from the source similarity group and writing them into the new destination similarity group identified to which the respective CS shards are going to get merged with.

The source and the destination similarity groups could be hosted on the same or distinct dedupe object service. There is no distinction based on where the similarity groups involved are hosted. The reading and writing back of the segments can happen through the standard defined IO paths in the file system.

The cleaning of the segments from the source similarity group that are copied to the new similarity group may be taken care of by the standard garbage collection service in the file system.

Fourth Phase: Merging the CS Shards

Once the required segments are successfully copied from the source similarity group to the target similarity group, the last step is to update the CS shard metadata in the L1 segment.

FIGS. 29-33 illustrate the process of identifying the potential CS shards that could be merged to reduce the overall CS shard count and get it within the permissible limits.

Figures 29, 30, 31:
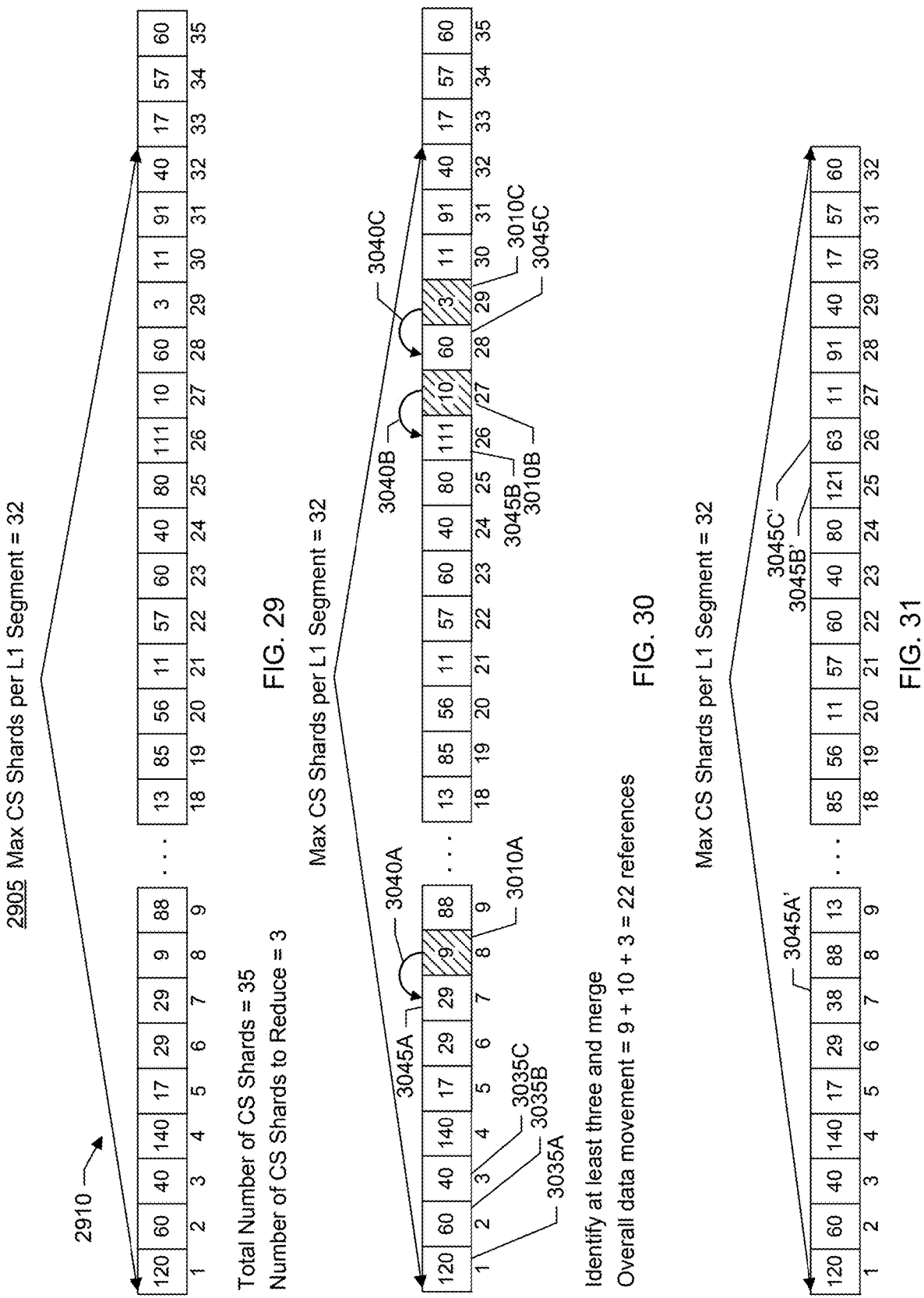
FIG. 29 shows an example of shards associated with an upper-level segment exceeding a maximum allows shard count, according to one or more embodiments.
FIG. 30 shows an example of identifying shards to merge with adjacent shards to reduce the shard count, according to one or more embodiments.
FIG. 31 shows an example of the shards after the merge, according to one or more embodiments.

Specifically, FIG. 29 shows an L1 segment 2905 that is associated with a set of shards 2910. The boxes in the figure indicate the shards. Each shard contains a set of references. The numbers in the boxes of the figure indicate the number of references a respective shard contains. The numbers below the boxes indicate the numbering of the shards. Each shard is associated with a similarity group. In the example shown in FIG. 29, the maximum number of shards per L1 segment is configured to be 32. The total number of shards, however, is 35. Thus, the number of shards to reduce is three in order to satisfy the maximum number of shards allowed per L1 segment, e.g., (35–32=3).

FIG. 30 shows an example of identifying the three shards to be merged with adjacent shards. Merging a shard "moves" the references contained in the shard into an immediately adjacent shard. The immediately adjacent shard may be referred to as an acquiring shard. The references then inherit the similarity group ID of the adjacent shard. As discussed, it is desirable to identify the shards having the fewest number of references for merging in order to reduce the amount of data movement across similarity groups.

In the example shown in FIG. 30, these shards include shards 3010A, B, and C. Shard 3010A includes nine references. Shard 3010B includes ten references. Shard 3010C includes three references. These shards contain the fewest number of references as compared to each other shard associated with the L1 segment. For example, a shard 3035A contains 120 references which is greater than the nine references contained in shard 3010A, the ten references contained in shard 3010B, and the three references contained in shard 3010C. A shard 3035B contains 60 references which is greater than the nine references contained in shard 3010A, the ten references contained in shard 3010B, and the three references contained in shard 3010C. A shard 3035C contains 40 references which is greater than the nine references contained in shard 3010A, the ten references contained in shard 3010B, and the three references contained in shard 3010C. And so forth.

Upon identifying the shards to merge, the shards are merged into immediately adjacent shards. Merging into an immediately adjacent shard helps to ensure that positions or ordering of the references in the shards are not changed or disturbed. Consider, as an example, a linear sequence of first, second, third, and fourth references that occupy first, second, third, and fourth positions, respectively. The first, second, and third references may be in a first shard. The fourth reference may be in a second shard, immediately after the first shard. The second shard may be merged with the first shard such that the positioning of the references is maintained (e.g., not moved). That is, the first shard now contains the first, second, third, and fourth references which continue to occupy the first, second, third, and fourth positions, respectively. That is, the second shard continues to be positioned after the first shard. The third shard continues to be positioned after the second shard. The fourth shard continues to be positioned after the third shard.

In the example shown in FIG. 30, shard 3010A is merged 3040A into an adjacent shard 3045A. After the merging, the references contained in now previous shard 3010A become associated with a similarity group assigned to adjacent shard 3045A. Shard 3010B is merged 3040B into an adjacent shard 3045B. After the merging, the references contained in now previous shard 3010B become associated with a similarity group assigned to adjacent shard 3045B. Shard 3010C is merged 3040C into an adjacent shard 3045C. After the merging, the references contained in now previous shard 3010C become associated with a similarity group assigned to adjacent shard 3045C.

FIG. 31 shows a result of the merge operations. The number of shards per L1 segment has been reduced to 32 (the threshold maximum shard per L1 segment). Shard 3045A' (previously shard 3045A) now contains 38 references, e.g., 29+9=38. Shard 3045B' (previously shard 3045B) now contains 121 references, e.g., 111+10=121. Shard 3045C' (previously shard 3045C) now contains 63 references, e.g., 60+3=63. Shards 3045A'-C' may be referred to as merged shards.

In an embodiment, shards identified as candidates for merging are merged with immediately adjacent shards that are to the left of the shards. It should be appreciated, however, that the shards may instead be merged with immediately adjacent shard to the right of the shards. There can be a combination of merging to the immediate left and immediate right.

In an embodiment, a method comprises determining that a count of shards associated with an L1 segment exceeds a threshold count of shards allowed per L1 segment by an excess value, each shard comprising one or more references and each shard being assigned to a similarity group; identifying candidate shards to be merged into immediately adjacent shards, a count of the candidate shards being equal to the excess value, and wherein each candidate shard comprises a count of references that is less than a count of references contained in any other shard associated with the L1 segment; and merging a candidate shard into a shard immediately adjacent to the candidate shard, the candidate shard being assigned to a first similarity group and the shard immediately adjacent to the candidate shard being assigned to a second similarity group, different from the first similarity group, wherein upon the merging, the one or more references from the candidate shard associated with the first similarity group become associated with the second similarity group assigned to the shard immediately adjacent to the candidate shard.

Figures 32, 33, 34:
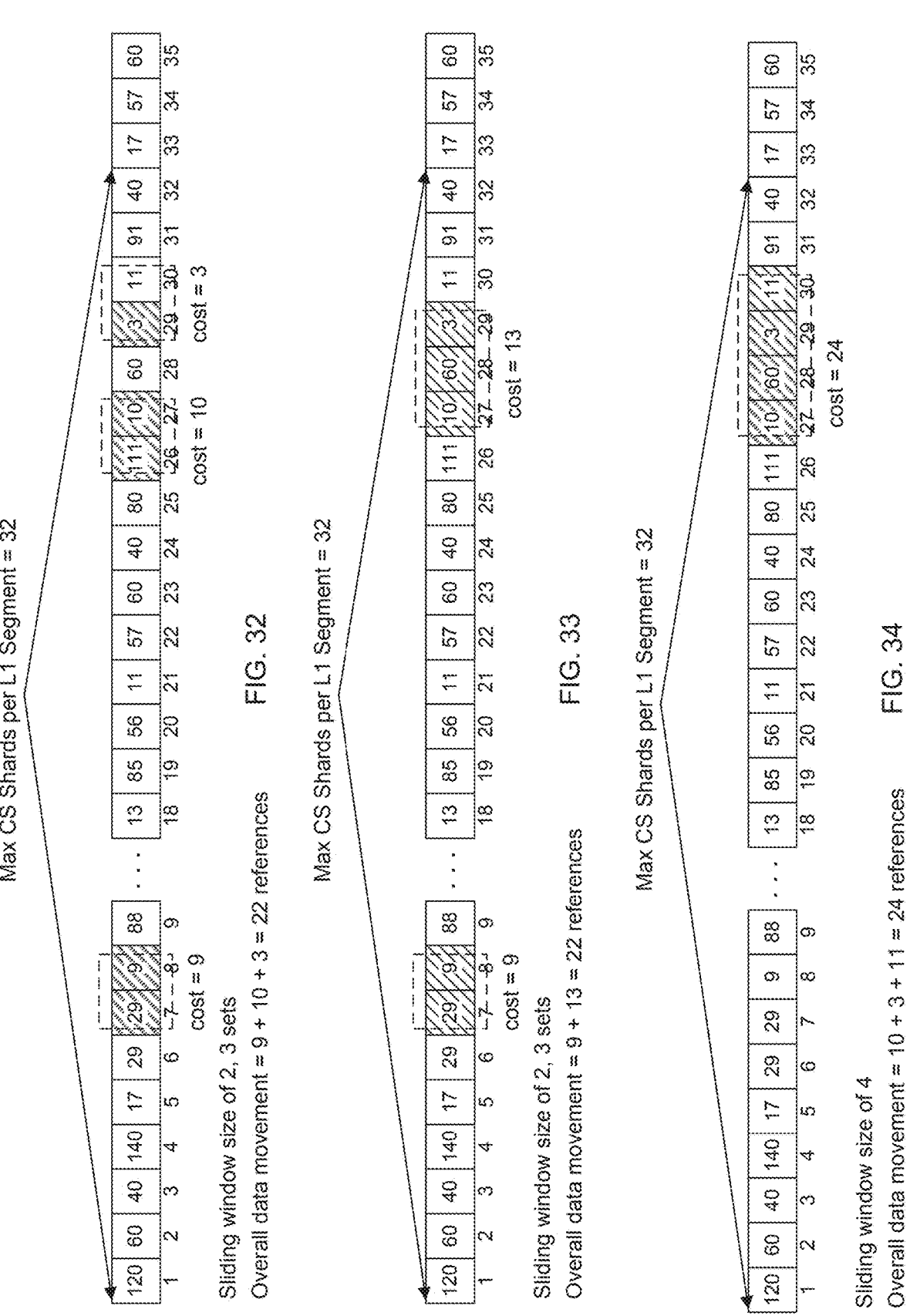
FIG. 32 shows an example of a sliding window technique to reduce the shard count, according to one or more embodiments.
FIG. 33 shows another example of a sliding window technique to reduce the shard count, according to one or more embodiments.
FIG. 34 shows another example of a sliding window technique to reduce the shard count, according to one or more embodiments.

FIG. 32 shows an example of a sliding window technique to reduce the number of shards per L1 segment when a count of the shards exceeds a threshold maximum number of shards allowed per L1 segment. FIG. 33 shows another example of a sliding window technique. FIG. 34 shows another example of a sliding window technique.

Figure 35:
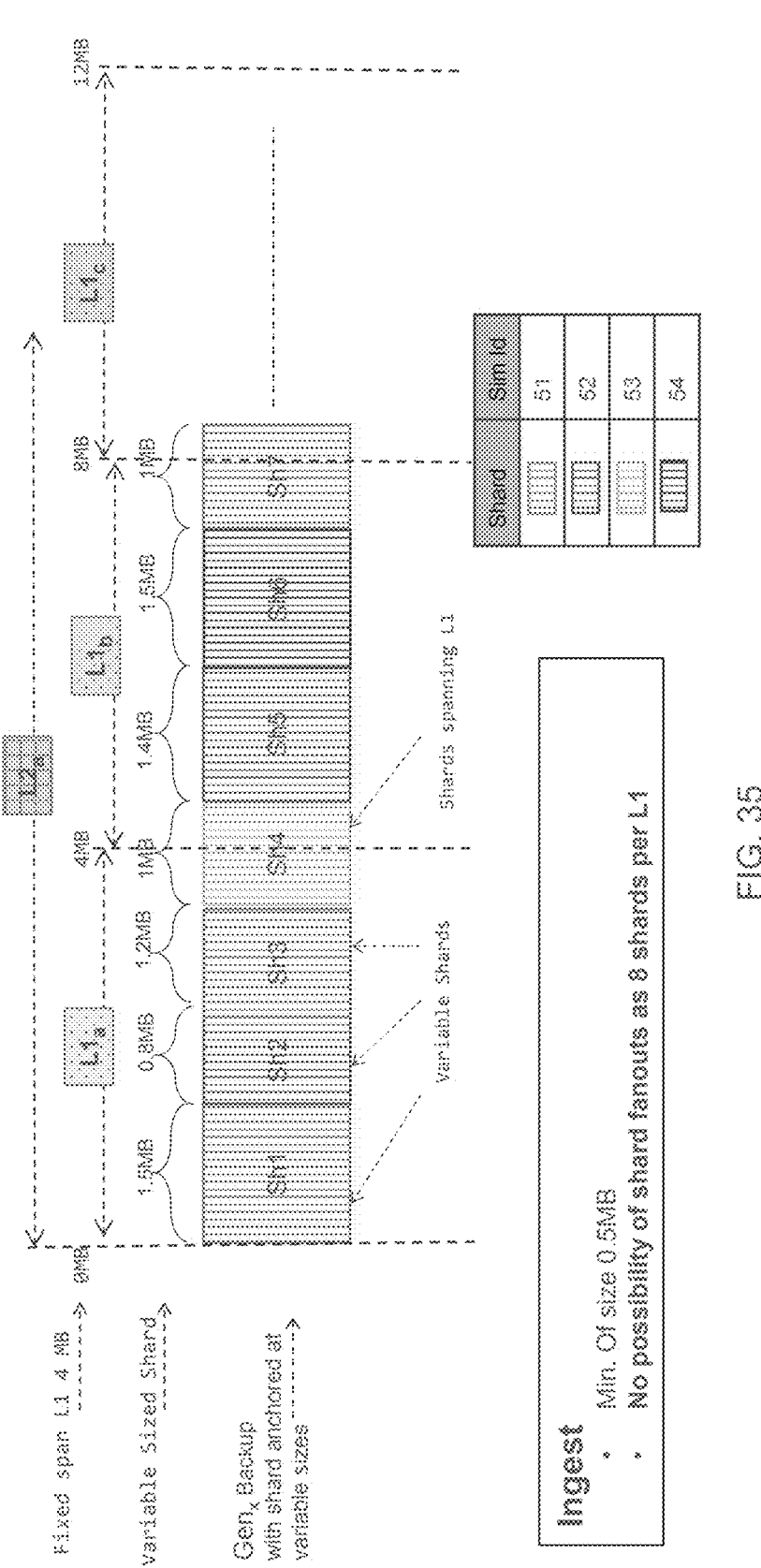
FIG. 35 shows an example of shard fanout and ingest, according to one or more embodiments.

FIG. 35 shows an example of shard fanouts and ingest.

FIG. 36 shows a flow for handling shard fanouts. In a step 3610, files in a deduplication filesystem are represented by segment trees. The segment trees include multiple segment levels arranged in a hierarchy. The files include a file segmented into upper-level segments. The upper-level segments include contiguous references to segments of the file that form a lowest-level of a segment tree for the file and are aligned at fixed-size boundaries in the file.

In a step 3615, a set of shards are formed for each upper-level segment. Each shard includes at least a subset of references from a respective upper-level segment and is assigned to a respective similarity group within which deduplication is performed.

In a step 3620, a determination is made that a count of shards in a particular set of shards bounded within, contained, or associated with a particular upper-level segment exceeds a threshold maximum allowed shard count by an excess shard count.

In a step 3625, an identification is made within the particular set of shards of a subset of shards, equal to the excess shard count, where each shard in the subset includes a number of contiguous references that is less than a number of contiguous references in any other shard outside the subset of the particular set of shards.

In a step 3630, a shard in the subset is merged with another shard immediately adjacent to the shard to create a merged shard.

In a step 3635, the merge is repeated for each other shard in the subset to reduce the count of shards in the particular set of shards to the threshold maximum allowed shard count.

In an embodiment, there is a method comprising: representing files in a file system by segment trees, the segment trees comprising multiple segment levels arranged in a hierarchy, the files comprising a file having been chunked into a plurality of upper-level segments, the upper-level segments comprising references to segments of the file that form a lowest-level of a segment tree for the file; forming a first plurality of shards for the file, each shard of the first plurality of shards comprising a starting offset and length within the file, a subset of the references, and being assigned to a similarity group within which deduplication is performed; receiving incremental changes to the file, the incremental changes specifying starting offsets and lengths in the file at which new data of the incremental changes should be written; writing the new data to a synthetic full backup of the file at the specified starting and offset lengths; and forming a second plurality of shards for the synthetic full backup, the second plurality of shards being partially aligned to the first plurality of shards and comprising: one or more shards spanning the new data, the one or more shards comprising references to segments of the new data and being assigned to respective one or more similarity groups, at least one shard immediately adjacent to the one or more shards, the at least one shard having a subset of references copied from a shard of the first plurality of shards and being assigned to a same similarity group as the shard of the first plurality of shards, and one or more remaining shards, each of the one or more remaining shards comprising a complete set of references copied from another shard of the first plurality of shards and being assigned to a same similarity group as the other shard of the first plurality of shards, wherein each shard of the first and second plurality of shards has a size that falls between a minimum threshold size and a maximum threshold size.

In another embodiment, there is a method comprising: representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file; forming a first plurality of shards for the file, each shard of the first plurality of shards being aligned in the file independent of an alignment of an upper-level segment, and including at least a subset of references from the upper-level segment; assigning the first plurality of shards to similarity groups within which deduplication is performed; receiving incremental changes to the file, the incremental changes including new data; and generating a virtual synthetic full backup of the file by: segmenting the new data into new upper-level segments, the new upper-level segments being aligned at fixed-size boundaries in the virtual synthetic full backup, and including new references to new segments of the new data; and forming a second plurality of shards for the virtual synthetic full backup, the shards of the second plurality of shards including shards that include the new references from the new upper-level segments and have new assignments to the similarity groups, and other shards that include copies of at least subsets of references from shards of the first plurality of shards and retain assignments to the similarity groups of the first plurality of shards.

The first and second plurality of shards may have variable sizes. The first and second plurality of shards may have a fixed-size. In an embodiment, the first and second plurality of shards have sizes ranging between a minimum threshold size and a maximum threshold size. In an embodiment, the upper-level segments of the segment tree for the file are previous upper-level segments and each shard of the second plurality of shards are aligned in the virtual synthetic full backup independent of an alignment of the new upper-level segments and the previous upper-level segments. In an embodiment, the second plurality of shards comprises at least one shard having at most a subset of references copied from an upper-level segment, the at least one shard being immediately adjacent to a shard that includes at least a subset of the new references.

In another embodiment, there is a system comprising: a processor; and memory configured to store one or more sequences of instructions which, when executed by the processor, cause the processor to carry out the steps of: representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file; forming a first plurality of shards for the file, each shard of the first plurality of shards being aligned in the file independent of an alignment of an upper-level segment, and including at least a subset of references from the upper-level segment; assigning the first plurality of shards to similarity groups within which deduplication is performed; receiving incremental changes to the file, the incremental changes including new data; and generating a virtual synthetic full backup of the file by: segmenting the new data into new upper-level segments, the new upper-level segments being aligned at fixed-size boundaries in the virtual synthetic full backup, and including new references to new segments of the new data; and forming a second plurality of shards for the virtual synthetic full backup, the shards of the second plurality of shards including shards that include the new references from the new upper-level segments and have new assignments to the similarity groups, and other shards that include copies of at least subsets of references from shards of the first plurality of shards and retain assignments to the similarity groups of the first plurality of shards.

In another embodiment, there is a computer program product, comprising a non-transitory computer-readable medium having a computer-readable program code embodied therein, the computer-readable program code adapted to be executed by one or more processors to implement a method comprising: representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file; forming a first plurality of shards for the file, each shard of the first plurality of shards being aligned in the file independent of an alignment of an upper-level segment, and including at least a subset of references from the upper-level segment; assigning the first plurality of shards to similarity groups within which deduplication is performed; receiving incremental changes to the file, the incremental changes including new data; and generating a virtual synthetic full backup of the file by: segmenting the new data into new upper-level segments, the new upper-level segments being aligned at fixed-size boundaries in the virtual synthetic full backup, and including new references to new segments of the new data; and forming a second plurality of shards for the virtual synthetic full backup, the shards of the second plurality of shards including shards that include the new references from the new upper-level segments and have new assignments to the similarity groups, and other shards that include copies of at least subsets of references from shards of the first plurality of shards and retain assignments to the similarity groups of the first plurality of shards.

In an embodiment, there is a method comprising: representing files in a file system by segment trees, the segment trees comprising multiple segment levels arranged in a hierarchy, the files comprising a file having been chunked into a plurality of upper-level segments, the upper-level segments comprising consecutive references to segments of the file that form a lowest-level of a segment tree for the file; forming a plurality of shards for each upper-level segment, each shard comprising a subset of the consecutive references from an upper-level segment, being contiguous with another shard, and assigned to a similarity group within which deduplication is performed; determining that a count of shards associated with the upper-level segment exceeds a threshold shard count by an excess shard count; identifying a subset of shards, equal to the excess shard count, where each shard in the subset associated with the upper-level segment comprises a number of consecutive references that is less than a number of consecutive references in any other shard outside the subset; merging a shard in the subset with another shard immediately adjacent to the shard to create a merged shard; and repeating the merging for each other shard in the subset to reduce the count of shards associated with the upper-level segment to the threshold shard count.

In an embodiment, there is a method comprising: representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file; forming a plurality of shards for each upper-level segment, each shard comprising a subset of references from a respective upper-level segment and being assigned to a respective similarity group within which deduplication is performed; determining that a count of shards in a particular plurality of shards bounded within a particular upper-level segment exceeds a threshold shard count by an excess shard count; identifying, in the particular plurality of shards, a subset of shards, equal to the excess shard count, wherein each shard in the subset includes a number of references that is less than a number of references in any other shard outside the subset of the particular plurality of shards; merging a shard in the subset with another shard immediately adjacent to the shard to create a merged shard; and repeating the merging for each other shard in the subset to reduce the count of shards in the particular plurality of shards to the threshold shard count.

The merged shard retains a similarity group assigned to the other shard immediately adjacent to the shard in the subset. In an embodiment, a size of the upper-level segment is fixed at 4 megabytes (MB). In an embodiment, the threshold shard count is 32. In an embodiment, a size of the shard ranges between a minimum size and a maximum size. In an embodiment, the method includes storing metadata about the plurality of shards within the upper-level segment.

In another embodiment, there is a system comprising: a processor; and memory configured to store one or more sequences of instructions which, when executed by the processor, cause the processor to carry out the steps of: representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file; forming a plurality of shards for each upper-level segment, each shard comprising a subset of references from a respective upper-level segment and being assigned to a respective similarity group within which deduplication is performed; determining that a count of shards in a particular plurality of shards bounded within a particular upper-level segment exceeds a threshold shard count by an excess shard count; identifying, in the particular plurality of shards, a subset of shards, equal to the excess shard count, wherein each shard in the subset includes a number of references that is less than a number of references in any other shard outside the subset of the particular plurality of shards; merging a shard in the subset with another shard immediately adjacent to the shard to create a merged shard; and repeating the merging for each other shard in the subset to reduce the count of shards in the particular plurality of shards to the threshold shard count.

In another embodiment, there is a computer program product, comprising a non-transitory computer-readable medium having a computer-readable program code embodied therein, the computer-readable program code adapted to be executed by one or more processors to implement a method comprising: representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file; forming a first plurality of shards for the file, each shard of the first plurality of shards being aligned in the file independent of an alignment of an upper-level segment, and including at least a subset of references from the upper-level segment; assigning the first plurality of shards to similarity groups within which deduplication is performed; receiving incremental changes to the file, the incremental changes including new data; and generating a virtual synthetic full backup of the file by: segmenting the new data into new upper-level segments, the new upper-level segments being aligned at fixed-size boundaries in the virtual synthetic full backup, and including new references to new segments of the new data; and forming a second plurality of shards for the virtual synthetic full backup, the shards of the second plurality of shards including shards that include the new references from the new upper-level segments and have new assignments to the similarity groups, and other shards that include copies of at least subsets of references from shards of the first plurality of shards and retain assignments to the similarity groups of the first plurality of shards.

In another embodiment, there is a method comprising: representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file; performing first anchoring of the references to form a first plurality of shards, each shard being aligned in the file independent of an alignment of an upper-level segment, and including at least a subset of references from the upper-level segment, the first anchoring comprising: opening a shard into which the references are collected; after a cumulative size of references collected into the shard has reached a threshold minimum, continuing to collect the references into the shard until at least one first event of encountering a reference that matches a pre-defined fixed pattern or determining that the cumulative size of references collected into the shard has reached a threshold maximum has occurred; and upon the at least one first event occurring, closing the shard and repeating the first anchoring with any references remaining; assigning the first plurality of shards to similarity groups within which deduplication is performed based on examining one or more references located at a beginning of a respective shard; receiving a request to generate a synthetic full backup of the file, the request comprising new data having new references, starting and ending offsets at which the new data is to be written to the synthetic full backup, and starting and ending offsets at which the references in the first plurality of shards should be copied to the synthetic full backup, the references now being previous references; performing second anchoring of the new and previous references to form a new plurality of shards, the second anchoring comprising: opening a new shard into which the new references are collected; after a cumulative size of new references collected into the new shard has reached the threshold minimum, continuing to collect the new references into the new shard until at least one second event of encountering a new reference that matches the pre-defined fixed pattern, determining that the cumulative size of new references collected into the new shard has reached the threshold maximum, or reaching the ending offset of new data has occurred; upon the at least one second event occurring, closing the new shard and repeating the second anchoring with any new references remaining; opening another new shard into which the previous references are copied; after a cumulative size of previous references copied into the other new shard has reached the threshold minimum, continuing to copy the previous references into the other new shard until at least one third event of encountering a previous reference that matches the pre-defined fixed pattern, determining that a cumulative size of previous references copied into the other new shard has reached the threshold maximum, or encountering a starting offset of another new data has occurred; and upon the at least one third event, closing the other new shard and repeating the second anchoring with any previous references remaining; and assigning the new plurality of shards to the similarity groups within which deduplication is performed based on examining one or more new or previous references located at a beginning of a respective new shard, wherein new shards comprising the new references for the new data receive new assignments to the similarity groups, but at least a subset of other new shards comprising the copied previous references from the first plurality of shards retain the same assignments to the similarity groups as the first plurality of shards from which the previous references were copied.

Figure 37:
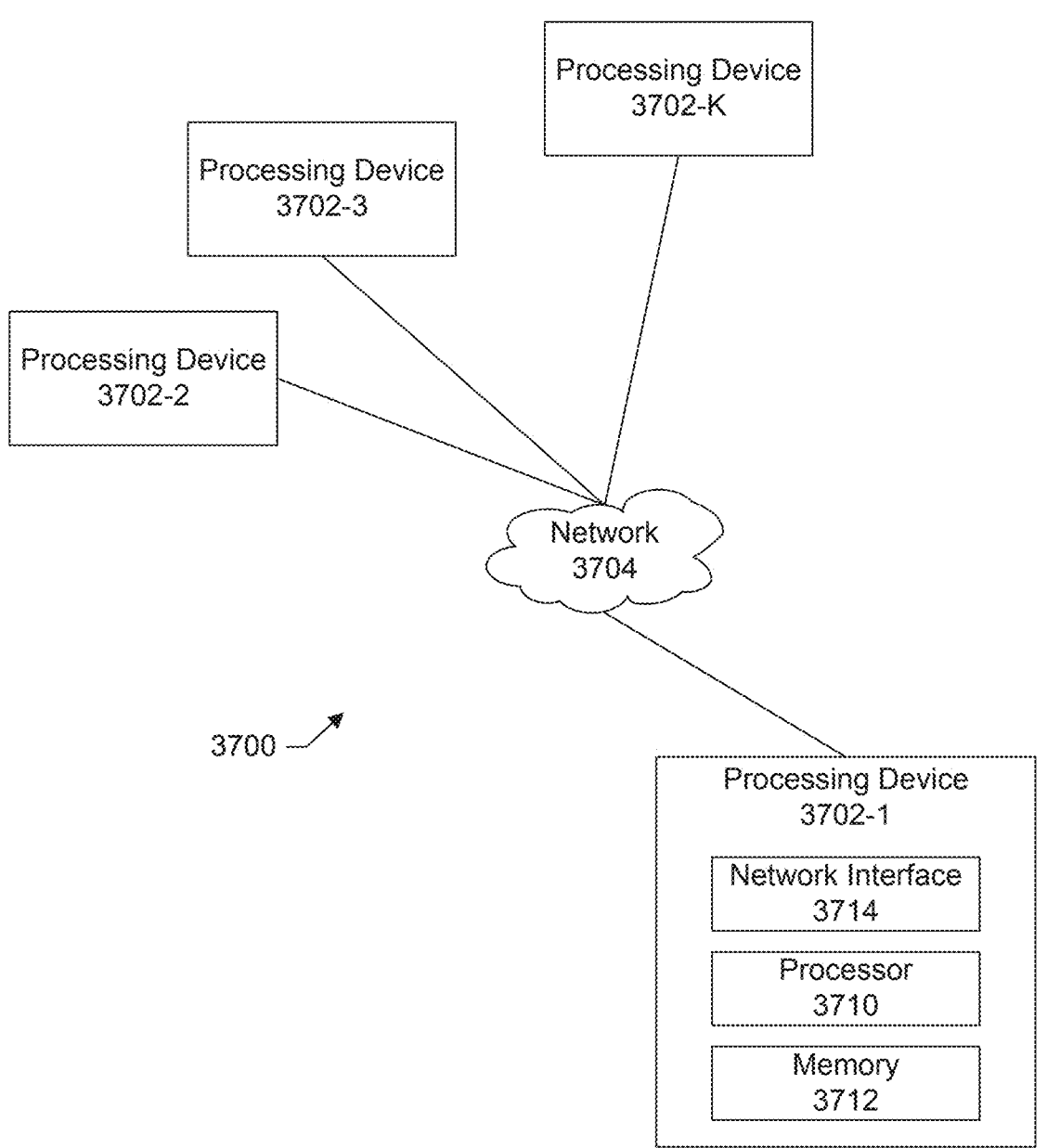
FIG. 37 shows a block diagram of a processing platform that may be utilized to implement at least a portion of an information processing system, according to one or more embodiments.

FIG. 37 shows an example of a processing platform 3700 that may include at least a portion of the information handling system shown in FIG. 1. The example shown in FIG. 37 includes a plurality of processing devices, denoted 3702-1, 3702-2, 3702-3, . . . 3702-K, which communicate with one another over a network 3704.

The network 3704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 3702-1 in the processing platform 3700 comprises a processor 3710 coupled to a memory 3712.

The processor 3710 may comprise a microprocessor, a microcontroller, an application-specific integrated circuit (ASIC), a field-programmable gate array (FPGA) or other type of processing circuitry, as well as portions or combinations of such circuitry elements.

The memory 3712 may comprise random access memory (RAM), read-only memory (ROM) or other types of memory, in any combination. The memory 3712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 3702-1 is network interface circuitry 3714, which is used to interface the processing device with the network 3704 and other system components, and may comprise conventional transceivers.

The other processing devices 3702 of the processing platform 3700 are assumed to be configured in a manner similar to that shown for processing device 3702-1 in the figure.

Again, the particular processing platform 3700 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 38:
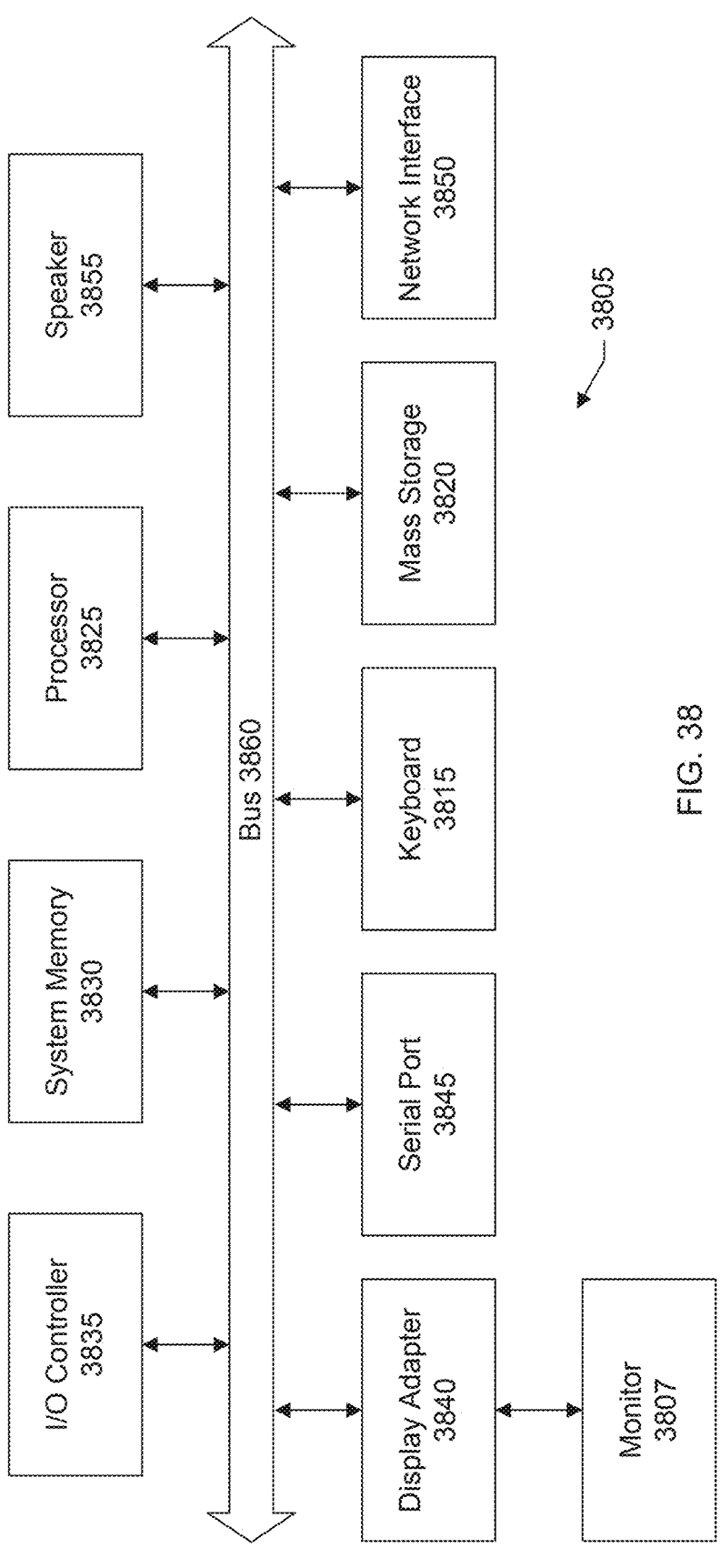
FIG. 38 shows a block diagram of a computer system suitable for use with the system, according to one or more embodiments.

FIG. 38 shows a system block diagram of a computer system 3805 used to execute the software of the present system described herein. The computer system includes a monitor 3807, keyboard 3815, and mass storage devices 3820. Computer system 3805 further includes subsystems such as central processor 3825, system memory 3830, input/output (I/O) controller 3835, display adapter 3840, serial or universal serial bus (USB) port 3845, network interface 3850, and speaker 3855. The system may also be used with computer systems with additional or fewer subsystems. For example, a computer system could include more than one processor 3825 (i.e., a multiprocessor system) or a system may include a cache memory.

Arrows such as 3860 represent the system bus architecture of computer system 3805. However, these arrows are illustrative of any interconnection scheme serving to link the subsystems. For example, speaker 3855 could be connected to the other subsystems through a port or have an internal direct connection to central processor 3825. The processor may include multiple processors or a multicore processor, which may permit parallel processing of information. Computer system 3805 shown in FIG. 38 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

representing, by a processor, files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file;

forming a first plurality of shards for the file, each shard of the first plurality of shards being aligned in the file independent of an alignment of an upper-level segment, and including at least a subset of references from the upper-level segment;

assigning the first plurality of shards to similarity groups within which deduplication is performed;

receiving incremental changes to the file, the incremental changes including new data; and generating a virtual synthetic full backup of the file by:

segmenting the new data into new upper-level segments, the new upper-level segments being aligned at fixed-size boundaries in the virtual synthetic full backup, and including new references to new segments of the new data; and forming a second plurality of shards for the virtual synthetic full backup, the shards of the second plurality of shards including shards that include the new references from the new upper-level segments and have new assignments to the similarity groups, and other shards that include copies of at least subsets of references from shards of the first plurality of shards and retain assignments to the similarity groups of the first plurality of shards.

2. The method of claim 1 wherein the first and second plurality of shards have variable sizes.

3. The method of claim 1 wherein the first and second plurality of shards have a fixed-size.

4. The method of claim 1 wherein the first and second plurality of shards have sizes ranging between a minimum threshold size and a maximum threshold size.

5. The method of claim 1 wherein the upper-level segments of the segment tree for the file are previous upper-level segments and each shard of the second plurality of shards are aligned in the virtual synthetic full backup independent of an alignment of the new upper-level segments and the previous upper-level segments.

6. The method of claim 1 wherein the second plurality of shards comprises at least one shard having at most a subset of references copied from an upper-level segment, the at least one shard being immediately adjacent to a shard that includes at least a subset of the new references.

7. A system comprising: a processor; and memory configured to store one or more sequences of instructions which, when executed by the processor, cause the processor to carry out the steps of:

representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file;

forming a first plurality of shards for the file, each shard of the first plurality of shards being aligned in the file independent of an alignment of an upper-level segment, and including at least a subset of references from the upper-level segment;

assigning the first plurality of shards to similarity groups within which deduplication is performed;

receiving incremental changes to the file, the incremental changes including new data; and generating a virtual synthetic full backup of the file by:

segmenting the new data into new upper-level segments, the new upper-level segments being aligned at fixed-size boundaries in the virtual synthetic full backup, and including new references to new segments of the new data; and forming a second plurality of shards for the virtual synthetic full backup, the shards of the second plurality of shards including shards that include the new references from the new upper-level segments and have new assignments to the similarity groups, and other shards that include copies of at least subsets of references from shards of the first plurality of shards and retain assignments to the similarity groups of the first plurality of shards.

8. The system of claim 7 wherein the first and second plurality of shards have variable sizes.

9. The system of claim 7 wherein the first and second plurality of shards have a fixed-size.

10. The system of claim 7 wherein the first and second plurality of shards have sizes ranging between a minimum threshold size and a maximum threshold size.

11. The system of claim 7 wherein the upper-level segments of the segment tree for the file are previous upper-level segments and each shard of the second plurality of shards are aligned in the virtual synthetic full backup independent of an alignment of the new upper-level segments and the previous upper-level segments.

12. The system of claim 7 wherein the second plurality of shards comprises at least one shard having at most a subset of references copied from an upper-level segment, the at least one shard being immediately adjacent to a shard that includes at least a subset of the new references.

13. A computer program product, comprising a non-transitory computer-readable medium having a computer-readable program code embodied therein, the computer-readable program code adapted to be executed by one or more processors to implement a method comprising:

representing files in a file system by segment trees, the segment trees comprising multiple segment levels arranged in a hierarchy, the files comprising a file having been segmented into a plurality of upper-level segments, the upper-level segments comprising references to segments of the file that form a lowest-level of a segment tree for the file and being aligned at fixed-size boundaries in the file;

forming a first plurality of shards for the file, each shard of the first plurality of shards being aligned in the file independent of an alignment of an upper-level segment, and including at least a subset of references from the upper-level segment;

assigning the first plurality of shards to similarity groups within which deduplication is performed;

receiving incremental changes to the file, the incremental changes including new data; and generating a virtual synthetic full backup of the file by:

segmenting the new data into new upper-level segments, the new upper-level segments being aligned at fixed-size boundaries in the virtual synthetic full backup, and including new references to new segments of the new data; and forming a second plurality of shards for the virtual synthetic full backup, the shards of the second plurality of shards including shards that include the new references from the new upper-level segments and have new assignments to the similarity groups, and other shards that include copies of at least subsets of references from shards of the first plurality of shards and retain assignments to the similarity groups of the first plurality of shards.

14. The computer program product of claim 13 wherein the first and second plurality of shards have variable sizes.

15. The computer program product of claim 13 wherein the first and second plurality of shards have a fixed-size.

16. The computer program product of claim 13 wherein the first and second plurality of shards have sizes ranging between a minimum threshold size and a maximum threshold size.

17. The computer program product of claim 13 wherein the upper-level segments of the segment tree for the file are previous upper-level segments and each shard of the second plurality of shards are aligned in the virtual synthetic full backup independent of an alignment of the new upper-level segments and the previous upper-level segments.

18. The computer program product of claim 13 wherein the second plurality of shards comprises at least one shard having at most a subset of references copied from an upper-level segment, the at least one shard being immediately adjacent to a shard that includes at least a subset of the new references.

\*  \*  \*  \*  \*